United States Patent
Jablokov et al.

(10) Patent No.: US 9,436,951 B1
(45) Date of Patent: *Sep. 6, 2016

(54) FACILITATING PRESENTATION BY MOBILE DEVICE OF ADDITIONAL CONTENT FOR A WORD OR PHRASE UPON UTTERANCE THEREOF

(75) Inventors: Victor Roman Jablokov, Charlotte, NC (US); Igor Roditis Jablokov, Charlotte, NC (US); James Richard Terrell, II, Charlotte, NC (US); Scott Edward Paden, Charlotte, NC (US)

(73) Assignee: Amazon Technologies, Inc., Seattle, WA (US)

( * ) Notice: Subject to any disclaimer, the term of this patent is extended or adjusted under 35 U.S.C. 154(b) by 627 days.

This patent is subject to a terminal disclaimer.

(21) Appl. No.: 12/198,116

(22) Filed: Aug. 25, 2008

Related U.S. Application Data

(63) Continuation-in-part of application No. 12/197,227, filed on Aug. 22, 2008, now abandoned.

(60) Provisional application No. 60/957,386, filed on Aug. 22, 2007, provisional application No. 60/957,393,
(Continued)

(51) Int. Cl.
    *G06F 15/16* (2006.01)
    *G06Q 30/02* (2012.01)
    (Continued)

(52) U.S. Cl.
    CPC ........... *G06Q 30/0269* (2013.01); *G10L 21/00* (2013.01); *G06F 3/167* (2013.01);
    (Continued)

(58) Field of Classification Search
    CPC ............. G06Q 30/02; G06Q 30/0256; G06Q 30/0271; G06Q 30/0631; G06Q 30/0269; G06Q 10/107; G10L 21/00; H04M 3/4938; H04M 1/72547; H04M 2201/40; G06F 17/30864; G06F 17/30867; G06F 17/30899; G06F 17/30905; G06F 3/167; H04L 12/58; H04L 67/02; H04L 69/329
    USPC ............ 709/206, 217, 219; 704/270.1, 235; 707/705, 736
    See application file for complete search history.

(56) References Cited

U.S. PATENT DOCUMENTS

| | | |
|---|---|---|
| 5,675,507 A | 10/1997 | Bobo |
| 5,974,413 A | 10/1999 | Beauregard et al. |

(Continued)

FOREIGN PATENT DOCUMENTS

| | | |
|---|---|---|
| EP | 1274222 A2 | 1/2003 |
| WO | WO 2006/101528 A1 | 9/2006 |

OTHER PUBLICATIONS

Web-based Telephony Bridges for the Deaf, Glaser et al.
(Continued)

*Primary Examiner* — Oleg Survillo
(74) *Attorney, Agent, or Firm* — Knobbe, Martens, Olson & Bear, LLP

(57) ABSTRACT

A method for presenting additional content for a word that is part of a message, and that is presented by a mobile communication device, includes the steps of: presenting the message, including emphasizing one or more words for which respective additional content is available for presenting by the mobile communication device; receiving an utterance that includes an emphasized word for which additional content is available for presenting by the mobile communication device; and presenting the additional content for the emphasized word included in the utterance received by the mobile communication device. These steps are performed by the mobile communication device.

45 Claims, 18 Drawing Sheets

Related U.S. Application Data filed on Aug. 22, 2007, provisional application No. 60/957,701, filed on Aug. 23, 2007, provisional application No. 60/957,702, filed on Aug. 23, 2007, provisional application No. 60/972,851, filed on Sep. 17, 2007, provisional application No. 60/972,853, filed on Sep. 17, 2007, provisional application No. 60/972,854, filed on Sep. 17, 2007, provisional application No. 60/972,936, filed on Sep. 17, 2007, provisional application No. 60/972,943, filed on Sep. 17, 2007, provisional application No. 60/972,944, filed on Sep. 17, 2007, provisional application No. 61/016,586, filed on Dec. 25, 2007, provisional application No. 61/021,341, filed on Jan. 16, 2008, provisional application No. 61/034,815, filed on Mar. 7, 2008, provisional application No. 61/038,046, filed on Mar. 19, 2008, provisional application No. 61/041,219, filed on Mar. 31, 2008, provisional application No. 61/091,330, filed on Aug. 22, 2008.

(51) Int. Cl.
| | |
|---|---|
| *G10L 21/00* | (2013.01) |
| *H04M 3/493* | (2006.01) |
| *G06Q 10/10* | (2012.01) |
| *G06Q 30/06* | (2012.01) |
| *H04M 1/725* | (2006.01) |
| *G06F 3/16* | (2006.01) |
| *H04L 12/58* | (2006.01) |
| *G06F 17/30* | (2006.01) |
| *H04L 29/08* | (2006.01) |

(52) U.S. Cl.
CPC ... *G06F17/30864* (2013.01); *G06F 17/30867* (2013.01); *G06F 17/30899* (2013.01); *G06F 17/30905* (2013.01); *G06Q 10/107* (2013.01); *G06Q 30/02* (2013.01); *G06Q 30/0256* (2013.01); *G06Q 30/0271* (2013.01); *G06Q 30/0631* (2013.01); *H04L 12/58* (2013.01); *H04L 67/02* (2013.01); *H04L 69/329* (2013.01); *H04M 1/72547* (2013.01); *H04M 3/4938* (2013.01); *H04M 2201/40* (2013.01)

(56) References Cited

U.S. PATENT DOCUMENTS

| | | |
|---|---|---|
| 6,173,259 B1 | 1/2001 | Bijl et al. |
| 6,219,407 B1 | 4/2001 | Kanevsky |
| 6,219,638 B1 | 4/2001 | Padmanabhan et al. |
| 6,298,326 B1 | 10/2001 | Feller |
| 6,490,561 B1 | 12/2002 | Wilson et al. |
| 6,532,446 B1 | 3/2003 | King |
| 6,654,448 B1 | 11/2003 | Agraharam et al. |
| 6,687,339 B2 | 2/2004 | Martin |
| 6,687,689 B1 | 2/2004 | Fung et al. |
| 6,760,700 B2 | 7/2004 | Lewis et al. |
| 6,775,360 B2 | 8/2004 | Davidson et al. |
| 6,816,578 B1 | 11/2004 | Kredo et al. |
| 6,820,055 B2 | 11/2004 | Saindon et al. |
| 6,895,084 B1 | 5/2005 | Saylor et al. |
| 7,035,804 B2 | 4/2006 | Saindon et al. |
| 7,089,184 B2 | 8/2006 | Rorex |
| 7,089,194 B1 | 8/2006 | Berstis et al. |
| 7,181,387 B2 | 2/2007 | Ju et al. |
| 7,200,555 B1 | 4/2007 | Ballard et al. |
| 7,206,932 B1 | 4/2007 | Kirchhoff |
| 7,225,224 B2 | 5/2007 | Nakamura |
| 7,233,655 B2 | 6/2007 | Gailey et al. |
| 7,236,580 B1 | 6/2007 | Sarkar et al. |
| 7,254,384 B2 | 8/2007 | Gailey et al. |
| 7,260,534 B2 | 8/2007 | Gandhi et al. |
| 7,302,280 B2 | 11/2007 | Hinckley et al. |
| 7,313,526 B2 | 12/2007 | Roth et al. |
| 7,330,815 B1 | 2/2008 | Jochumson |
| 7,401,122 B2 | 7/2008 | Chen |
| 7,539,086 B2 | 5/2009 | Jaroker |
| 7,571,100 B2 | 8/2009 | Lenir et al. |
| 7,577,569 B2 | 8/2009 | Roth et al. |
| 7,590,534 B2 | 9/2009 | Vatland |
| 7,634,403 B2 | 12/2009 | Roth et al. |
| 7,650,284 B2 | 1/2010 | Cross et al. |
| 7,668,718 B2 | 2/2010 | Kahn et al. |
| 7,716,058 B2 | 5/2010 | Roth et al. |
| 7,890,586 B1 | 2/2011 | McNamara et al. |
| 8,032,372 B1 | 10/2011 | Zimmerman et al. |
| 8,050,918 B2 | 11/2011 | Ghasemi et al. |
| 8,106,285 B2 | 1/2012 | Gerl et al. |
| 8,135,578 B2 | 3/2012 | HÉBert |
| 8,140,632 B1 | 3/2012 | Jablokov et al. |
| 8,145,493 B2 | 3/2012 | Cross, Jr. et al. |
| 8,296,377 B1 | 10/2012 | Jablokov et al. |
| 8,335,829 B1 | 12/2012 | Jablokov et al. |
| 8,335,830 B2 | 12/2012 | Jablokov et al. |
| 2002/0035474 A1 | 3/2002 | Alpdemir |
| 2002/0052781 A1 | 5/2002 | Aufricht et al. |
| 2002/0165719 A1 | 11/2002 | Wang et al. |
| 2002/0165773 A1 | 11/2002 | Natsuno et al. |
| 2003/0008661 A1 | 1/2003 | Joyce et al. |
| 2003/0028601 A1 | 2/2003 | Rowe |
| 2003/0050778 A1 | 3/2003 | Nguyen et al. |
| 2003/0101054 A1 | 5/2003 | Davis et al. |
| 2003/0105630 A1 | 6/2003 | MacGinitie et al. |
| 2003/0126216 A1 | 7/2003 | Avila et al. |
| 2003/0144906 A1 | 7/2003 | Fujimoto et al. |
| 2003/0200093 A1 | 10/2003 | Lewis et al. |
| 2003/0212554 A1 | 11/2003 | Vatland |
| 2003/0220798 A1 | 11/2003 | Schmid et al. |
| 2004/0005877 A1 | 1/2004 | Väänänen |
| 2004/0015547 A1 | 1/2004 | Griffin et al. |
| 2004/0059632 A1 | 3/2004 | Kang et al. |
| 2004/0059708 A1 | 3/2004 | Dean et al. |
| 2004/0107107 A1 | 6/2004 | Lenir et al. |
| 2004/0133655 A1 | 7/2004 | Yen et al. |
| 2004/0151358 A1 | 8/2004 | Yanagita et al. |
| 2004/0176906 A1 | 9/2004 | Matsubara et al. |
| 2005/0010641 A1 | 1/2005 | Staack |
| 2005/0021344 A1 | 1/2005 | Davis et al. |
| 2005/0027538 A1 | 2/2005 | Halonen et al. |
| 2005/0080786 A1 | 4/2005 | Fish et al. |
| 2005/0101355 A1 | 5/2005 | Hon et al. |
| 2005/0197145 A1 | 9/2005 | Chae et al. |
| 2005/0209868 A1* | 9/2005 | Wan et al. ............. 705/1 |
| 2005/0239495 A1 | 10/2005 | Bayne |
| 2005/0240406 A1 | 10/2005 | Carroll |
| 2005/0261907 A1 | 11/2005 | Smolenski et al. |
| 2005/0288926 A1 | 12/2005 | Benco et al. |
| 2006/0052127 A1 | 3/2006 | Wolter |
| 2006/0053016 A1 | 3/2006 | Falcon et al. |
| 2006/0217159 A1 | 9/2006 | Watson |
| 2006/0235695 A1 | 10/2006 | Thrift et al. |
| 2007/0038740 A1 | 2/2007 | Steeves |
| 2007/0038923 A1 | 2/2007 | Patel |
| 2007/0061300 A1 | 3/2007 | Ramer et al. |
| 2007/0079383 A1* | 4/2007 | Gopalakrishnan ........... 726/26 |
| 2007/0115845 A1 | 5/2007 | Hochwarth et al. |
| 2007/0118426 A1 | 5/2007 | Barnes, Jr. |
| 2007/0118592 A1 | 5/2007 | Bachenberg |
| 2007/0123222 A1* | 5/2007 | Cox et al. ............. 455/414.1 |
| 2007/0133769 A1 | 6/2007 | Da Palma et al. |
| 2007/0133771 A1 | 6/2007 | Stifelman et al. |
| 2007/0156400 A1 | 7/2007 | Wheeler |
| 2007/0180718 A1 | 8/2007 | Fourquin et al. |
| 2007/0239837 A1 | 10/2007 | Jablokov et al. |
| 2007/0255794 A1 | 11/2007 | Coutts |
| 2008/0016142 A1 | 1/2008 | Schneider |
| 2008/0040683 A1* | 2/2008 | Walsh ............. 715/786 |
| 2008/0065481 A1 | 3/2008 | Immorlica et al. |
| 2008/0065737 A1* | 3/2008 | Burke et al. ............. 709/217 |
| 2008/0155060 A1* | 6/2008 | Weber et al. ............. 709/218 |
| 2008/0195588 A1* | 8/2008 | Kim et al. ............. 707/3 |

(56) References Cited

U.S. PATENT DOCUMENTS

| | | | |
|---|---|---|---|
| 2008/0198981 | A1 | 8/2008 | Skakkebaek et al. |
| 2008/0208590 | A1* | 8/2008 | Cross et al. ................. 704/275 |
| 2008/0261564 | A1 | 10/2008 | Logan |
| 2008/0275864 | A1* | 11/2008 | Kim et al. ........................ 707/5 |
| 2008/0275873 | A1 | 11/2008 | Bosarge et al. |
| 2008/0301250 | A1 | 12/2008 | Hardy |
| 2009/0012793 | A1 | 1/2009 | Dao et al. |
| 2009/0043855 | A1 | 2/2009 | Bookstaff et al. |
| 2009/0055175 | A1 | 2/2009 | Terrell, II et al. |
| 2009/0076917 | A1 | 3/2009 | Jablokov et al. |
| 2009/0077493 | A1 | 3/2009 | Hempel et al. |
| 2009/0083032 | A1 | 3/2009 | Jablokov et al. |
| 2009/0117922 | A1 | 5/2009 | Bell |
| 2009/0124272 | A1 | 5/2009 | White et al. |
| 2009/0141875 | A1 | 6/2009 | Demmitt et al. |
| 2009/0163187 | A1 | 6/2009 | Terrell, II |
| 2009/0170478 | A1 | 7/2009 | Doulton |
| 2009/0182560 | A1 | 7/2009 | White |
| 2009/0228274 | A1 | 9/2009 | Terrell, II et al. |
| 2009/0240488 | A1 | 9/2009 | White et al. |
| 2009/0248415 | A1 | 10/2009 | Jablokov et al. |
| 2009/0271194 | A1 | 10/2009 | Davis et al. |
| 2009/0276215 | A1 | 11/2009 | Hager |
| 2009/0282363 | A1 | 11/2009 | Jhaveri et al. |
| 2010/0049525 | A1 | 2/2010 | Paden |
| 2010/0058200 | A1 | 3/2010 | Jablokov et al. |
| 2010/0146077 | A1* | 6/2010 | Davies et al. ................. 709/219 |
| 2010/0180202 | A1 | 7/2010 | Del Valle Lopez |
| 2010/0182325 | A1* | 7/2010 | Cederwall et al. ........... 345/473 |
| 2010/0191619 | A1 | 7/2010 | Dicker et al. |
| 2010/0278453 | A1* | 11/2010 | King ............................. 382/321 |
| 2010/0279667 | A1 | 11/2010 | Wehrs et al. |
| 2010/0293242 | A1 | 11/2010 | Buchheit et al. |
| 2011/0029876 | A1 | 2/2011 | Slotznick et al. |
| 2011/0047452 | A1 | 2/2011 | Ativanichayaphong et al. |
| 2011/0064207 | A1 | 3/2011 | Chiu et al. |
| 2011/0161276 | A1 | 6/2011 | Krumm et al. |
| 2011/0313764 | A1 | 12/2011 | Bacchiani et al. |
| 2012/0259729 | A1 | 10/2012 | Linden et al. |
| 2013/0158994 | A1* | 6/2013 | Jaramillo et al. ............. 704/235 |

OTHER PUBLICATIONS

SoftBridge: An Architecture for Building IP-based Bridges over the Digital Divide, Lewis et al.

"International Search Report" and "Written Opinion of the International Search Authority" (Korean Intellectual Property Office) in Yap, Inc. International Patent Application Serial No. PCT/US2007/008621 corresponding to current U.S. patent application, Dated Nov. 13, 2007, 8 pages.

Fielding, et al., Hypertext Transfer Protocol—HTTP/1.1, RFC 2616, Network Working Group, sections 7, 9.5, 14.30, 12 pages total.

Marshall, James, HTTP Made Really Easy, Aug. 15, 1997, retrieved from http://www.jmarshall.com/easy/http/ on Jul. 25, 2008, 15 pages total.

Knudsen, Jonathan, Session Handling in MIDP, Jan. 2002, retrieved from http://developers.sun.com/mobility/midp/articles/sessions/ on Jul. 25, 2008, 7 pages total.

Information Disclosure Statement (IDS) Letter Regarding Common Patent Application(s), Dated Jun. 4, 2010.

David H. Kemsley, et al., A Survey of Neural Network Research and Fielded Applications, 1992, in International Journal of Neural Networks: Research and Applications, vol. 2, No. 2/3/4, pp. 123-133. Accessed on Oct. 25, 2007 at http://citeseer.ist.psu.edu/cache/papers/cs/25638/ftp:zSzzSzaxon.cs.byu.eduzSzpubzSzpaperszSzkemsley_92.pdf/kemsley92survey.pdf, 12 pages total.

Transl8it! translation engine, publicly available on http://www.transl8it.com since May 30, 2002. Retrieved on Oct. 26, 2007, 6 pages total.

vBulletin Community Forum, thread posted on Mar. 5, 2004. Page retrieved on Oct. 26, 2007 from http://www.vbulletin.com/forum/showthread.php?t=96976, 1 page total.

J2EE Application Overview, publicly available on http://www/orionserver.com/docs/j2eeoverview.html since Mar. 1, 2001. Retrieved on Oct. 26, 2007, 3 pages total.

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

Information Disclosure Statement (IDS) Letter Regarding Common Patent Application(s), submitted by Applicant on Jul. 21, 2009.

Information Disclosure Statement (IDS) Letter Regarding Common Patnet Application(s), dated Mar. 17, 2011.

Huang, J., Zweig, G., Padmanabhan, M., 2002, Extracting caller information from voicemail, Springer-Verlag Berlin Heidelberg, 11 pages.

Bisani, M., et al., Automatic editing in a back-end speech-to-text system, 2008, 7 pages.

Brown, E., et al., Capitalization Recovery for Text, Springer-Verlag Berlin Heidelberg, 2002, 12 pages.

Desilets, A., et al., Extracting keyphrases from spoken audio documents, Springer-Verlag Berlin Heidelberg, 2002, 15 pages.

Glaser et al., Web-based Telephony Bridges for the Deaf, 5 pages total. Proceedings of the South African Telecommunications Networks & Applications Conference (SATNAC 2003), George, South Africa.

Gotoh, Y., et al., Sentence Boundary Detection in Broadcase Speech Transcripts, Proceedings fo the ISCA Workshop, 2000, 8 pages.

Huang, J., et al., Maximum entropy model for punctuation annonntation from speech, In: ICSLP 2002, pp. 917-920.

Information Disclousre Statement (IDS) Letter Regarding Common Patent Application(s), dated Dec. 6, 2010.

Information Disclousre Statement (IDS) Letter Regarding Common Patent Application(s), dated Feb. 14, 2012.

Information Disclousre Statement (IDS) Letter Regarding Common Patent Application(s), dated Jul. 21, 2011.

Information Disclousre Statement (IDS) Letter Regarding Common Patent Application(s), dated Nov. 24, 2009.

Justo, R., et al., Phrase classes in two-level language models for ASR, Springer-Verlag London Limited, 2008, 11 pages.

Kimura, K., et al., Assocation-based natural language processing with neural networks, In proceedings of the 7th annual meeting of the association of computational linguistics, 1992, pp. 223-231.

Lewis et al., SoftBridge: An Architecture for Building IP-based Bridges over the Digital Divide, 5 pages total, Proceedings of the South African Telecommunications Networks & Applications Conference (SATNAC 2001), Wild Coast Sun, South Africa.

Ries, K., Segmenting conversations by topic, initiative, and style, Springer-Verlag Berlin Heidelberg, 2002, 16 pages.

Shriberg, E., et al., Prosody-based automatic segmentation of speech into sentences and topics, 2000, 31 pages.

Thomae, M., Fabian, T.,et al., Hierarchical Language Models for One-Stage Speech Interpretation, In Interspeech—2005, pp. 3425-3428.

* cited by examiner

| Adam  | "hey, what are you doing tonight?" |
| Betty | "I don't know, what did you have in mind?" |
| Adam  | "I have this inexplicable craving for sushi. What do you think?" |
| Betty | "That sounds good, I haven't had sushi in forever. Maybe we could see a movie afterwards?" |
| Adam  | "Sounds good to me, pick you up at 7?" |
| Betty | "See you then" |

*FIG. 4*

Adam: hey, what are you doing tonight?

Betty: I don't know, what did you want to do 2nite?

Adam: I have this inexplicable craving for sushi. What do you think?

Betty: That sounds good, I haven't had sushi in forever. Maybe we could see a movie afterwards?

Adam: Sounds good to me, pick you up at 7?

Betty: See you then

FACILITATING PRESENTATION BY MOBILE DEVICE OF ADDITIONAL CONTENT FOR A WORD OR PHRASE UPON UTTERANCE THEREOF

CROSS-REFERENCE TO RELATED APPLICATION

The present application is a U.S. continuation-in-part patent application of, and claims priority under 35 U.S.C. §120 to, U.S. nonprovisional patent application Ser. No. 12/197,227 filed Aug. 22, 2008 now abandoned, which '227 application is a nonprovisional patent application of, and claims priority under 35 U.S.C. §119(e) to, both U.S. provisional patent application Ser. No. 60/957,386, filed Aug. 22, 2007 and entitled "CONTINUOUS SPEECH TRANSCRIPTION PERFORMANCE INDICATION", and U.S. provisional patent application Ser. No. 60/957,393, filed Aug. 22, 2007 and entitled "VOICE CLICK FOR SPEECH-ENABLED APPLICATIONS." The present application also is a nonprovisional patent application of, and claims priority under 35 U.S.C. §119(e) to, each of the following:

(1) U.S. provisional patent application Ser. No. 60/957,701, filed Aug. 23, 2007 and entitled "CONTINUOUS SPEECH TRANSCRIPTION PERFORMANCE INDICATION;"

(2) U.S. provisional patent application Ser. No. 60/957,702, filed Aug. 23, 2007 and entitled "VOICE CLICK FOR SPEECH-ENABLED APPLICATIONS;"

(3) U.S. provisional patent application Ser. No. 60/972,851, filed Sep. 17, 2007 and entitled "SYSTEM AND METHOD FOR DELIVERING MOBILE ADVERTISING WITHIN A THREADED SMS OR IM CHAT CONVERSATION ON A MOBILE DEVICE CLIENT;"

(4) U.S. provisional patent application Ser. No. 60/972,853, filed Sep. 17, 2007 and entitled "METHOD AND SYSTEM FOR DYNAMIC PERSONALIZATION AND QUERYING OF USER PROFILES BASED ON SMS/IM CHAT MESSAGING ON A MOBILE DEVICE;"

(5) U.S. provisional patent application Ser. No. 60/972,854, filed Sep. 17, 2007 and entitled "LOCATION, TIME & SEASON AWARE MOBILE ADVERTISING DELIVERY;"

(6) U.S. provisional patent application Ser. No. 60/972,936, filed Sep. 17, 2007 and entitled "DELIVERING TARGETED ADVERTISING TO MOBILE DEVICE FOR PRESENTATION WITHIN SMSes OR IM CONVERSATIONS;"

(7) U.S. provisional patent application Ser. No. 60/972,943, filed Sep. 17, 2007 and entitled "Dynamic Personalization and Querying of User Profiles Based on SMSes and IM Conversations;"

(8) U.S. provisional patent application Ser. No. 60/972,944, filed Sep. 17, 2007 and entitled "Location, Time, and Season Aware Advertising Delivery to and Presentation on Mobile Device Within SMSes or IM Conversations or User Interface Thereof;"

(9) U.S. provisional patent application Ser. No. 61/016,586, filed Dec. 25, 2007 and entitled "VALIDATION OF MOBILE ADVERTISING FROM DERIVED INFORMATION;"

(10) U.S. provisional patent application Ser. No. 61/021,341, filed Jan. 16, 2008 and entitled "CONTINUOUS SPEECH TRANSCRIPTION UTTERANCE EMPHASIS AND SILENCE INDICATION;"

(11) U.S. provisional patent application Ser. No. 61/034,815, filed Mar. 7, 2008 and entitled "USE OF INTERMEDIATE SPEECH TRANSCRIPTION RESULTS IN EDITING FINAL SPEECH TRANSCRIPTION RESULTS;"

(12) U.S. provisional patent application Ser. No. 61/038,046, filed Mar. 19, 2008 and entitled "CORRECTIVE FEEDBACK LOOP FOR AUTOMATED SPEECH RECOGNITION;"

(13) U.S. provisional patent application Ser. No. 61/041,219, filed Mar. 31, 2008 and entitled "USE OF METADATA TO POST PROCESS SPEECH RECOGNITION OUTPUT;" and

(14) U.S. provisional patent application Ser. No. 61/091,330, filed Aug. 22, 2008 and entitled "METHODS, APPARATUSES, AND SYSTEMS FOR PROVIDING TIMELY USER CUES PERTAINING TO SPEECH RECOGNITION."

Each of the foregoing patent applications from which priority is claimed, and any corresponding patent application publications thereof, are hereby incorporated herein by reference in their entirety. Additionally, the disclosure of provisional application 60/789,837 is contained in Appendix A attached hereto and, likewise, is incorporated herein in its entirety by reference and is intended to provide background and technical information with regard to the systems and environments of the inventions of the current provisional patent application. Similarly, the disclosure of the brochure of Appendix B is incorporated herein in its entirety by reference. Additionally, U.S. provisional patent application Ser. No. 60/957,706, filed Aug. 23, 2007 and titled "POST-PROCESSING TRANSCRIPTION RESULTS WITH FILTERS AND FINITE GRAMMARS," and U.S. provisional patent application Ser. No. 61/021,335, filed Jan. 16, 2008 and titled "USING A PHYSICAL PHENOMENA DETECTOR TO START AND STOP RECORDING FOR A SPEECH RECOGNITION ENGINE," are each incorporated herein by reference.

Finally, the disclosures of each of the following patent applications, and any corresponding patent application publications thereof, are incorporated herein by reference: U.S. nonprovisional patent application Ser. No. 12/198,112, filed Aug. 25, 2008 and titled "FILTERING TRANSCRIPTIONS OF UTTERANCES," and U.S. nonprovisional patent application Ser. No. 12/197,213, filed Aug. 22, 2008

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

BACKGROUND OF THE INVENTION

Mobile applications that display text message threads are often deployed on devices that have limited visual display area, such as mobile phones. Additionally, there may be advertising content linked to elements (words, phrases, punctuation, etc.) of the conversation. Due to the small display area, visual advertising content must remain hidden or be as unobtrusive as possible until the user wishes to access it.

One approach is to highlight the elements that have additional advertising (or other content) such that no additional space is taken up on the display, but the user is still aware of the visual cue. Text color, font, font weight, and the like are all ways that this can be accomplished.

After the user has been made aware of the visual content cues, they may select them to access the additional content. This might be done by navigating and selecting highlighted cues with a keypad, or by selecting them directly with a pointing device, such as a mouse, touchpad, or the like. Unfortunately, this can be unwieldy and inconvenient on a small device, especially when the user is involved in other tasks, such as driving a car, that require visual attention and which occupy the hands and eyes at the same time.

Thus, a need exists for an approach whereby speech transcription is used to access additional content associated with textual conversation data while minimizing user distraction and the use of hands and eyes. This need is addressed by one or more aspects of the invention.

SUMMARY OF THE INVENTION

The present invention includes many aspects and features. Moreover, while many aspects and features relate to, and are described in, the context of instant messaging and SMS messaging, the present invention is not limited to use only in such contexts, as will become apparent from the following summaries and detailed descriptions of aspects, features, and one or more embodiments of the present invention. For instance, the invention is equally applicable to use in the context of voicemails and emails.

Accordingly, in a first Mobile applications that display text message threads are often deployed on devices that have limited visual display area, such as mobile phones. Additionally, there may be advertising content linked to elements (words, phrases, punctuation, etc.) of the conversation. Due to the small display area, visual advertising content must remain hidden or be as unobtrusive as possible until the user wishes to access it.

One approach is to highlight the elements that have additional advertising (or other content) such that no additional space is taken up on the display, but the user is still aware of the visual cue. Text color, font, font weight, and the like are all ways that this can be accomplished.

After the user has been made aware of the visual content cues, they may select them to access the additional content. This might be done by navigating and selecting highlighted cues with a keypad, or by selecting them directly with a pointing device, such as a mouse, touchpad, or the like. Unfortunately, this can be unwieldy and inconvenient on a small device, especially when the user is involved in other tasks, such as driving a car, that require visual attention and which occupy the hands and eyes at the same time.

Thus, a need exists for an approach whereby speech transcription is used to access additional content associated with textual conversation data while minimizing user distraction and the use of hands and eyes. This need is addressed by one or more aspects of the invention.

In a first aspect of the invention, a method for presenting additional content for a word that is part of a message, and that is presented by a mobile communication device, includes the steps performed by the mobile communication device of: presenting the message, including emphasizing one or more words for which respective additional content is available for presenting by the mobile communication device; receiving an utterance that includes an emphasized word for which additional content is available for presenting by the mobile communication device; and presenting the additional content for the emphasized word included in the utterance received by the mobile communication device.

In a feature of the aspect, the mobile communication device is a phone.

In a feature of the aspect, the additional content is presented by playing audio over a speaker of the mobile communication device.

In a feature of the aspect, said step of presenting the message, including emphasizing one or more words for which respective additional content is available for presenting by the mobile communication device, comprises the step of playing audio of the message on the mobile communication device, wherein the audio includes pronunciation emphasis for the one or more words for which respective additional content is available for presenting by the mobile communication device.

In a feature, said step of presenting the message, including emphasizing one or more words for which respective additional content is available for presenting by the mobile communication device, comprises the step of playing audio of the message on the mobile communication device, wherein the audio includes aural cueing for the one or more words for which respective additional content is available for presenting by the mobile communication device.

In a feature, said step of presenting the message, including emphasizing one or more words for which respective additional content is available for presenting by the mobile communication device, comprises the step of displaying text of the message on the mobile communication device such that the one or more words, for which respective additional content is available for presenting on the mobile communication device, are highlighted. The respective additional content for an emphasized word may be presented by expanding the displayed text of the message to include the respective additional content in conjunction with the emphasized word.

In a feature, the additional content includes a web address, an email address, or geospatial information.

In a feature, the additional content is presented by displaying a video on the mobile communication device.

In a feature, the additional content is presented in a web browser of the mobile communication device.

In a feature, the additional content is presented in a popup window of the mobile communication device.

In a feature, a particular word for which respective additional content is available for presenting by the mobile communication device consists of a single word.

In a feature, a particular word for which respective additional content is available for presenting by the mobile communication device comprises a phrase.

In a feature, a particular word for which respective additional content is available for presenting by the mobile communication device comprises an alphanumeric string.

In a feature, the utterance includes a cue indicating that the utterance includes an emphasized word for which respective additional content is available for presenting by the mobile communication device.

In a feature, multiple alternative additional content exists for a particular word that are available for presenting by the mobile communication device, and further includes presenting by the mobile communication device the additional content of each such alternative.

In another feature, the method further includes the steps of receiving non-verbal input by the mobile communication device, which input represents a selection of an emphasized word for which respective additional content is to be presented by the mobile communication device; and presenting, by the mobile communication device, the additional content for the selected word, whereby additional content may be presented during times when the mobile communication device is unable to successfully receive an utterance.

In a feature, multiple alternative additional content exists for a particular word that are available for presenting by the mobile communication device, and further includes the steps of selecting and presenting additional content of one of the alternatives.

The step of selecting additional content of one of the alternatives may be performed by a user of the mobile communication device, or may be performed in accordance with a computer algorithm.

In another aspect of the invention, a method for presenting additional content for a word that is part of a message and that is presented by a mobile communication device, includes the steps performed by the mobile communication device of: presenting the message, including emphasizing one or more words for which respective additional content is available for presenting by the mobile communication device; communicating an utterance for transcription, the utterance being received by the mobile communication device and including an emphasized word that is presented and for which additional content is available for presenting by the mobile communication device; receiving a transcription of the utterance, including a textual representation of the emphasized word; and based on the textual representation of the emphasized word, presenting the additional content for such emphasized word.

In a feature, said step of communicating an utterance for transcription includes recording the utterance and sending audio data representing the recorded utterance.

In a feature, said step of communicating an utterance for transcription includes streaming a recording of the utterance.

In a feature, the respective additional content for each of the emphasized words that are presented by the mobile communication device is received by and stored in the mobile communication device before the transcription of the utterance is received by the mobile communication device. The respective additional content in this respect is stored in a memory of the mobile communication device in association with the emphasized word to which the additional content pertains, with the additional content that is presented being based on a match of the textual representation of the emphasized word with the emphasized words stored in the memory of the mobile communication device.

In a feature, the mobile communication device is a phone.

In a feature, said step of presenting the message, including emphasizing one or more words for which respective additional content is available for presenting by the mobile communication device, comprises the step of playing audio of the message on the mobile communication device, wherein the audio includes pronunciation emphasis or aural cueing for the one or more words for which respective additional content is available for presenting by the mobile communication device.

In a feature, said step of presenting the message, including emphasizing one or more words for which respective additional content is available for presenting by the mobile communication device, comprises the step of displaying text of the message on the mobile communication device such that the one or more words, for which respective additional content is available for presenting on the mobile communication device, are highlighted.

In another aspect of the invention, a method for presenting additional content for a word that is part of a message and that is presented by a mobile communication device, the steps performed by the mobile communication device of: presenting the message, including emphasizing one or more words for which respective additional content is available for presenting by the mobile communication device; communicating an utterance for transcription, the utterance being received by the mobile communication device and including an emphasized word that is presented and for which additional content is available for presenting by the mobile communication device; in response to communicating the utterance for transcription, receiving the additional content for the emphasized word; and presenting the additional content received for the emphasized word.

In a feature, said step of communicating an utterance for transcription includes recording the utterance and sending audio data representing the recorded utterance.

In a feature, said step of communicating an utterance for transcription includes streaming a recording of the utterance.

In a feature, said step of presenting the message, including emphasizing one or more words for which respective additional content is available for presenting by the mobile communication device, comprises the step of playing audio of the message on the mobile communication device, wherein the audio includes pronunciation emphasis or aural cueing for the one or more words for which respective additional content is available for presenting by the mobile communication device.

In a feature, said step of presenting the message, including emphasizing one or more words for which respective additional content is available for presenting by the mobile communication device, comprises the step of displaying text of the message on the mobile communication device such that the one or more words, for which respective additional content is available for presenting on the mobile communication device, are highlighted.

In another aspect of the invention, a method for presenting additional content for a word that is part of a message and that is presented by a mobile communication device, includes the steps performed by the mobile communication device of: presenting the message, including emphasizing one or more words for which respective additional content is available for presenting by the mobile communication device; communicating an utterance for transcription, the utterance being received by the mobile communication device and including an emphasized word that is presented and for which additional content is available for presenting by the mobile communication device; in response to communicating the utterance for transcription, receiving additional content data for the emphasized word; and presenting the additional content for the emphasized word based on the received additional content data.

The additional content data may include a web address, and the step of presenting the additional content for the emphasized word based on the received additional content data comprises opening the web address in a web browser of the mobile communication device. The step of communicating an utterance for transcription may include recording the utterance and sending audio data representing the recorded utterance, or the step of communicating an utterance for transcription may include streaming a recording of the utterance.

The step of presenting the message, including emphasizing one or more words for which respective additional content is available for presenting by the mobile communication device, may include the step of playing audio of the message on the mobile communication device, wherein the audio includes pronunciation emphasis or aural cueing for the one or more words for which respective additional content is available for presenting by the mobile communication device, or the step of presenting the message, including emphasizing one or more words for which respective additional content is available for presenting by the mobile communication device, may include the step of displaying text of the message on the mobile communication device such that the one or more words, for which respective additional content is available for presenting on the mobile communication device, are highlighted.

In another aspect of the invention, a method facilitating the presentation of additional content for a word that is part of a transcribed utterance intended for a message, includes the steps of, first: receiving audio data communicated from a mobile communication device, the audio data representing an utterance that is intended to be at least a portion of the text of a message that is to be sent from the mobile communication device to a recipient; transcribing the utterance to text based on the audio data; screening the text to identify words that are appropriate for searching; searching for additional content in one or more databases based on words identified as being appropriate for searching; identifying the words for which respective additional content is found in the searching; communicating the transcribed text with the identified words to the mobile communication device such that the identified words are emphasized when the text is presented by the mobile communication device; and maintaining in a database an association between the identified words, the respective additional content found for such words during searching, and an identifier of the mobile communication device. The method includes the steps of, thereafter, receiving audio data communicated from the mobile communication device, the audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content to the mobile communication device that is maintained in the database in association with an identified word found in the transcribed text based on the comparing.

In a feature, said step of communicating to the mobile communication device the respective additional content that is maintained in the database in association with an identified word included in the transcribed text includes communicating to the mobile communication device the respective additional content that is maintained in the database in association with each identified word that is found in the transcribed text based on the comparing.

In a feature, the step of identifying the words for which respective additional content is found in the searching comprises highlighting the words such that the words are emphasized when displayed on the mobile communication device.

In a feature, the step of identifying the words for which respective additional content is found in the searching comprises configuring an audio presentation of the transcription to include pronunciation emphasis of the words for which respective additional content is found in the searching.

In a feature, the step of identifying the words for which respective additional content is found in the searching comprises configuring an audio presentation of the transcription to include aural cueing for the words for which respective additional content is found in the searching.

In a feature, the audio data that is received from the mobile communication device representing an utterance that is intended to be at least a portion of the text of a message is received with an indication of the type of message. The indication may be that the message is an instant message, or that the message is to be sent from the mobile communication device in accordance with a text messaging protocol. The method further may include filtering the transcribed text based on the indication.

In another aspect of the invention, a method facilitating the presentation of additional content for a word that is part of a transcribed utterance intended for a message, includes the steps of, first: receiving audio data communicated from a mobile communication device, the audio data representing an utterance that is intended to be at least a portion of the text of a message that is to be sent from the mobile communication device to a recipient; transcribing the utterance to text based on the audio data; screening the text to identify words that are appropriate for searching; searching for additional content in one or more databases based on words identified as being appropriate for searching; identifying the words for which respective additional content is found in the searching; communicating the transcribed text with the identified words to the mobile communication device such that the identified words are emphasized when the text is presented by the mobile communication device; and maintaining in a database an association between the identified words, respective additional content data for such words, and an identifier of the mobile communication device. The method further includes the steps of, thereafter, receiving audio data communicated from the mobile communication device, the audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content data to the mobile communication device that is maintained in the database in association with an identified word found in the transcribed text based on the comparing.

In a feature, the searching includes searching based on an identified word using an Internet search engine and analyzing the results provided in response thereto.

In a feature, the additional content data comprises a web address for passing to a web browser of the mobile communication device.

In a feature, the additional content data comprises a URL for retrieving the additional content for presentation by the mobile communication device.

In a feature, the searching includes sending a keyword to a third party SMS service and analyzing the results provided in response thereto.

In a feature, the additional content data comprises a keyword for sending to a third party SMS service, in response to which is provided the additional content found in the searching.

In a feature, said step of receiving audio data communicated from the mobile communication device, the audio data representing an utterance that includes an identified word that is maintained in the database in association with the identifier of the mobile communication device, comprises receiving audio data representing an utterance that further includes a cue that an identified word is included in the utterance for presenting the additional content for such identified word.

In a feature, the association between the identified words, respective additional content data for such words, and an identifier of the mobile communication device is maintained in the database for an extended period of time includes a plurality of days or weeks, whereby additional content may be provided for an identified word communicated to the mobile communication device even though a plurality of days have passed since the identified word was communicated to the mobile communication device.

In another aspect of the invention, a method of facilitating the presentation of additional content for a word that is part of a transcribed utterance intended for a message includes the steps of, first: receiving audio data communicated from a mobile communication device, the audio data representing an utterance that is intended to be at least a portion of the text of a message that is to be sent from the mobile communication device to a recipient; transcribing the utterance to text based on the audio data; screening the text to identify words that are appropriate for searching; searching for additional content in one or more databases based on words identified as being appropriate for searching; identifying the words for which respective additional content is found in the searching; communicating the transcribed text with the identified words to the mobile communication device such that the identified words are emphasized when the text is presented by the mobile communication device; and maintaining in a database an association between the identified words, respective additional content data for such words, and an identifier of the mobile communication device; thereafter, receiving audio data communicated from the mobile communication device, the audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; retrieving the respective additional content found in the search by utilizing the additional content data maintained in the database in association with an identified word found in the transcribed text based on the comparing; and communicating the retrieved additional content to the mobile communication device. The additional content data may be a web address or a URL for retrieving the addition content, or may be a keyword for sending to a third party SMS service, in response to which is provided the additional content found in the searching.

In another aspect, a method for presenting additional content for a word that is part of a message, and that is presented by a mobile communication device, includes the steps of: first, by a server, receiving an identifier of the mobile communication device and audio data communicated from the mobile communication device, the audio data representing an utterance that is intended to be at least a portion of the text of a message that is to be sent from the mobile communication device to a recipient; transcribing the utterance to text based on the audio data; screening the text to identify words that are appropriate for searching; searching for additional content in one or more databases based on words identified as being appropriate for searching; identifying the words for which respective additional content is found in the searching; communicating the transcribed text with the identified words to the mobile communication device such that the identified words are emphasized when the text is presented by the mobile communication device; and maintaining in a database an association between the identified words, the respective additional content found for such words during searching, and an identifier of the mobile communication device. The method includes next the step, by the mobile communication device, of presenting the message, including emphasizing the identified words for which the respective additional content is available for presenting by the mobile communication device; and then the steps, by the server, of receiving an identifier of the mobile communication device and audio data communicated from the mobile communication device, the audio data representing an utterance received by the mobile communication device, the utterance including an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content to the mobile communication device that is maintained in the database in association with an identified word found in the transcribed text based on the comparing. The method then includes the step, by the mobile communication device, of presenting the additional content received from the server.

In a feature, said step of communicating to the mobile communication device the respective additional content that is maintained in the database in association with an identified word included in the transcribed text includes communicating to the mobile communication device the respective additional content that is maintained in the database in association with each identified word that is found in the transcribed text based on the comparing, and the step of presenting the additional content received from the server by the mobile communication device comprises presenting each respective additional content received from the server.

In a feature, the step of identifying the words for which respective additional content is found in the searching comprises highlighting the words such that the words are emphasized when displayed on the mobile communication device.

In a feature, the step of identifying the words for which respective additional content is found in the searching comprises configuring an audio presentation of the transcription to include pronunciation emphasis of the words for which respective additional content is found in the searching.

In a feature, the step of identifying the words for which respective additional content is found in the searching comprises configuring an audio presentation of the transcription to include aural cueing for the words for which respective additional content is found in the searching.

In a feature, the audio data that is received from the mobile communication device representing an utterance that is intended to be at least a portion of the text of a message is received with an indication of the type of message. The indication may indicate that the message is an instant message; or that the message is to be sent from the mobile communication device in accordance with a text messaging protocol. The method may further include filtering the transcribed text based on the indication.

In another aspect of the invention, a method facilitating the presentation of additional content for a word that is part of a transcribed utterance intended for a message includes the steps of, first, by a server, receiving an identifier of the mobile communication device and audio data communicated from the mobile communication device, the audio data representing an utterance that is intended to be at least a portion of the text of a message that is to be sent from the mobile communication device to a recipient; transcribing the utterance to text based on the audio data; screening the text to identify words that are appropriate for searching; searching for additional content in one or more databases based on words identified as being appropriate for searching; identifying the words for which respective additional content is found in the searching; communicating the transcribed text with the identified words to the mobile communication device such that the identified words are emphasized when the text is presented by the mobile communication device; and maintaining in a database an association between the identified words, respective additional content data for such words, and an identifier of the mobile communication device. The method includes, next, the steps performed by the mobile communication device of presenting the message, including emphasizing the identified words for which the respective additional content is available for presenting by the mobile communication device. The method then includes the steps, performed by a server, of receiving an identifier of the mobile communication device and audio data communicated from the mobile communication device, the audio data representing an utterance received by the mobile communication device, the utterance including an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content data to the mobile communication device that is maintained in the database in association with an identified word found in the transcribed text based on the comparing. The method then includes the steps, performed by the mobile communication device, of presenting the additional content based on the additional content data received from the server.

In a feature, the searching includes searching based on an identified word using an Internet search engine and analyzing the results provided in response thereto.

In a feature, the additional content data comprises a web address, and the step of presenting the additional content based on the received additional content data comprises opening the web address in a web browser of the mobile communication device.

In a feature, the additional content data comprises a URL for retrieving the additional content for presentation by the mobile communication device, and the step of presenting the additional content based on the received additional content data comprises passing the URL to an appropriate application of the mobile communication device.

In a feature, the searching includes sending a keyword to a third party SMS service and analyzing the results provided in response thereto.

In a feature, the additional content data comprises a keyword for sending to a third party SMS service, and the step of presenting the additional content based on the received additional content data comprises sending the keyword to the third party SMS service and receiving in response thereto the additional content data.

In a feature, said step of receiving audio data communicated from the mobile communication device, the audio data representing an utterance that includes an identified word that is maintained in the database in association with the identifier of the mobile communication device, comprises receiving audio data representing an utterance that further includes a cue that an identified word is included in the utterance for presenting the additional content for such identified word.

In a feature, the association between the identified words, respective additional content data for such words, and an identifier of the mobile communication device is maintained in the database for an extended period of time includes a plurality of days or weeks, whereby additional content may be provided for an identified word communicated to the mobile communication device even though a plurality of days have passed since the identified word was communicated to the mobile communication device.

In a feature, said step of presenting the message, including emphasizing the identified words for which respective additional content is available for presenting by the mobile communication device, comprises the step of playing audio of the message on the mobile communication device, wherein the audio includes pronunciation emphasis for the identified words for which respective additional content is available for presenting by the mobile communication device.

In a feature, said step of presenting the message, including emphasizing the identified words for which respective additional content is available for presenting by the mobile communication device, comprises the step of playing audio of the message on the mobile communication device, wherein the audio includes aural cueing for the identified words for which respective additional content is available for presenting by the mobile communication device.

In a feature, said step of presenting the message, including emphasizing the identified words for which respective additional content is available for presenting by the mobile communication device, comprises the step of displaying text of the message on the mobile communication device such that the identified words, for which respective additional content is available for presenting on the mobile communication device, are highlighted.

In another aspect of the invention, a method facilitating the presentation of additional content for a word that is part of the text of a message presented by a mobile communication device includes the steps of, first: screening the text of a message to identify words that are appropriate for searching; searching for additional content in one or more databases based on words identified as being appropriate for searching; identifying the words for which respective additional content is found in the searching; communicating the identified words to the mobile communication device such that the identified words are emphasized when the text of the message is presented by the mobile communication device; and maintaining in a database an association between the identified words, the respective additional content found for such words during searching, and an identifier of the mobile communication device to which the identified words were communicated. The method further includes the steps of, thereafter, receiving from the mobile communication device to which the identified words were communicated the identifier of the mobile communication device and audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content to the mobile communication device that is maintained in the database in association with an identified word found in the transcribed text based on the comparing.

In a feature, the mobile communication device is a mobile phone.

In a feature, the step of identifying the words for which respective additional content is found in the searching comprises highlighting the words such that the words are emphasized when displayed on the mobile communication device.

In a feature, the step of identifying the words for which respective additional content is found in the searching comprises configuring an audio presentation of the transcription to include pronunciation emphasis of the words for which respective additional content is found in the searching.

In a feature, the step of identifying the words for which respective additional content is found in the searching comprises configuring an audio presentation of the transcription to include aural cueing for the words for which respective additional content is found in the searching.

In a feature, the message is an instant message and the mobile communication device is the recipient of the instant message.

In a feature, the message is an instant message and the mobile communication device is the sender of the instant message.

In a feature, the message is a text message and the mobile communication device is the recipient of the text message.

In a feature, the message is a text message and the mobile communication device is the sender of the text message.

In another aspect of the invention, a method facilitating the presentation of additional content for a word that is part of the text of a message presented by a mobile communication device includes the steps of, first: screening the text of a message to identify words that are appropriate for searching; searching for additional content in one or more databases based on words identified as being appropriate for searching; identifying the words for which respective additional content is found in the searching; communicating the identified words to the mobile communication device such that the identified words are emphasized when the text of the message is presented by the mobile communication device; and maintaining in a database an association between the identified words, respective additional content data for such words, and an identifier of the mobile communication device to which the identified words were communicated. The method includes the steps of, thereafter: receiving from the mobile communication device to which the identified words were communicated the identifier of the mobile communication device and audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content data to the mobile communication device that is maintained in the database in association with an identified word found in the transcribed text based on the comparing.

In a feature, the searching includes searching based on an identified word using an Internet search engine and analyzing the results provided in response thereto.

In a feature, the additional content data comprises a web address for passing to a web browser of the mobile communication device.

In a feature, the additional content data comprises a URL for retrieving the additional content for presentation by the mobile communication device.

In a feature, the searching includes sending a keyword to a third party SMS service and analyzing the results provided in response thereto.

In a feature, the additional content data comprises a keyword for sending to a third party SMS service, in response to which is provided the additional content found in the searching.

In a feature, said step of receiving audio data communicated from the mobile communication device, the audio data representing an utterance that includes an identified word that is maintained in the database in association with the identifier of the mobile communication device, comprises receiving audio data representing an utterance that further includes a cue that an identified word is included in the utterance for presenting the additional content for such identified word.

In a feature, the association between the identified words, respective additional content data for such words, and an identifier of the mobile communication device is maintained in the database for an extended period of time includes a plurality of days or weeks, whereby additional content may be provided for an identified word communicated to the mobile communication device even though a plurality of days have passed since the identified word was communicated to the mobile communication device.

In a feature, the steps of the method are performed by a text messaging service provider.

In a feature, the steps of the method are performed by an Instant Messaging service provider.

In a feature, said step of communicating the identified words to the mobile communication device such that the identified words are emphasized when the text of the message is presented by the mobile communication device includes communicating the text of the message with the identified words to the mobile communication device.

In addition to the aforementioned aspects and features of the present invention, it should be noted that the present invention further encompasses the various possible combinations and subcombinations of such aspects and features.

BRIEF DESCRIPTION OF THE DRAWINGS

Further aspects, features, embodiments, and advantages of the present invention will become apparent from the following detailed description with reference to the drawings, wherein:

FIG. 4 is a transcription of a chronological sequence of communications, between the two users, that transpires using the mobile phones and the portion of the communication system shown in FIG. 3;

FIG. 5 is a graphical illustration of the chronological sequence of communications of FIG. 4 as it might appear on a display of an instant messaging (IM) client on one of the users' mobile phones;

DETAILED DESCRIPTION OF PREFERRED EMBODIMENTS

Figure 1:
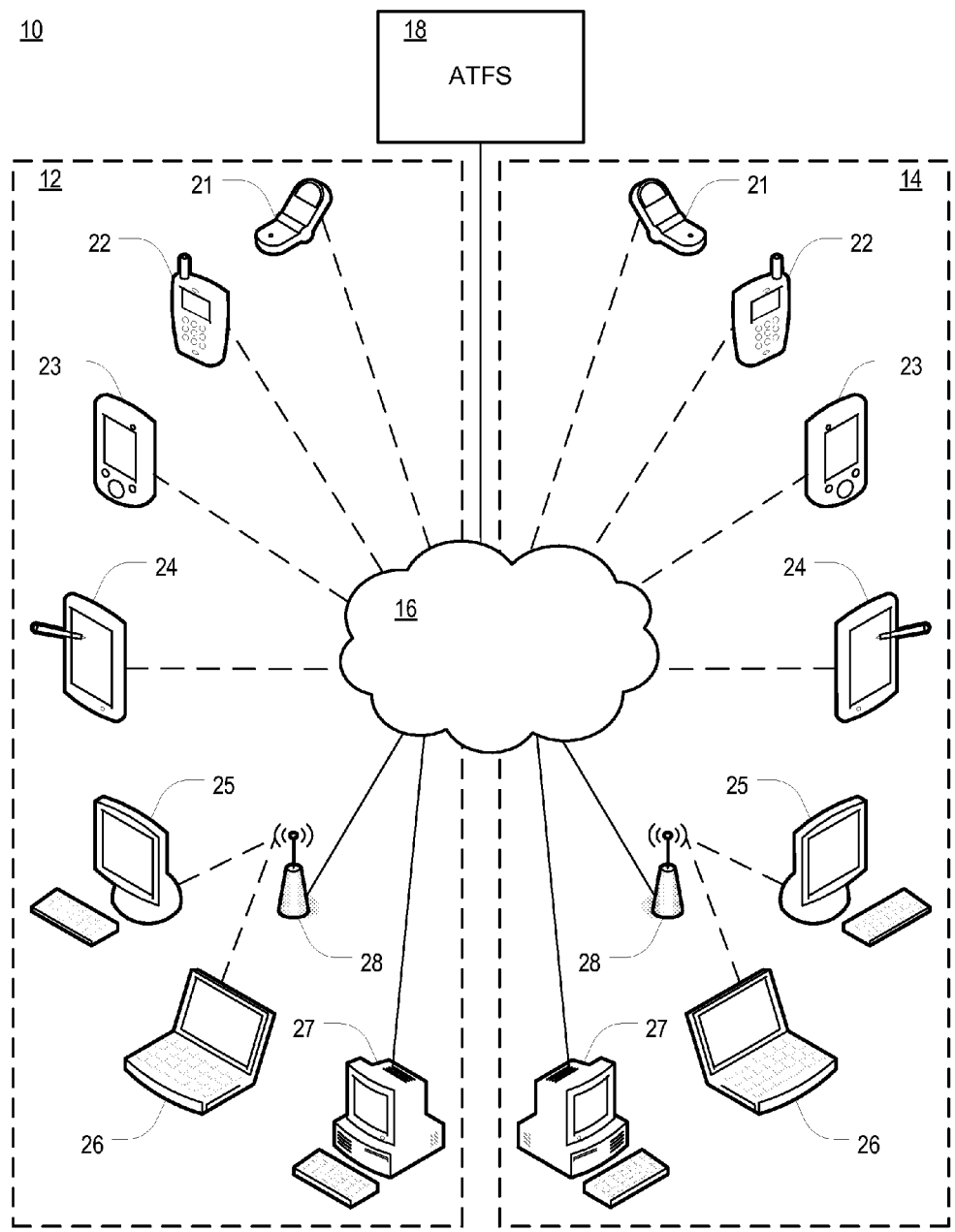
FIG. 1 is a diagram of a communication system in which one or more preferred embodiments of the invention may be practiced.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a diagram of a communication system 10 in which one or more preferred embodiments of the invention may be practiced. As shown therein, the communication system 10 includes at least one transmitting device 12 and at least one receiving device 14, one or more network systems 16 for connecting the transmitting device 12 to the receiving device 14, and an automatic transcription & filtering ("ATFS") system 18, including a voice-to-text or automatic speech recognition ("ASR") engine. Transmitting and receiving devices 12,14 may include mobile phones 21, smart phones 22, PDAs 23, tablet notebooks 24, various desktop and laptop computers 25,26,27, two-way pagers, and the like. One or more of the devices 12,14, such as the illustrated iMac and laptop computers 25,26, may connect to the network systems 16 via wireless access points 28. The various transmitting and receiving devices 12,14 (one or both types of which being sometimes referred to herein as "client devices") may be of any conventional design and manufacture.

It will be appreciated that FIG. 1 is intended primarily to provide context in which inventive aspects and features of the present invention may be practiced. Furthermore, in the context of text messaging, the communication system 10 preferably includes, inter alia, a telecommunications network. In the context of instant messaging, the communications systems 10,60 each preferably includes, inter alia, the Internet and an Instant Messaging (IM) service provider and associated server.

Figure 2:
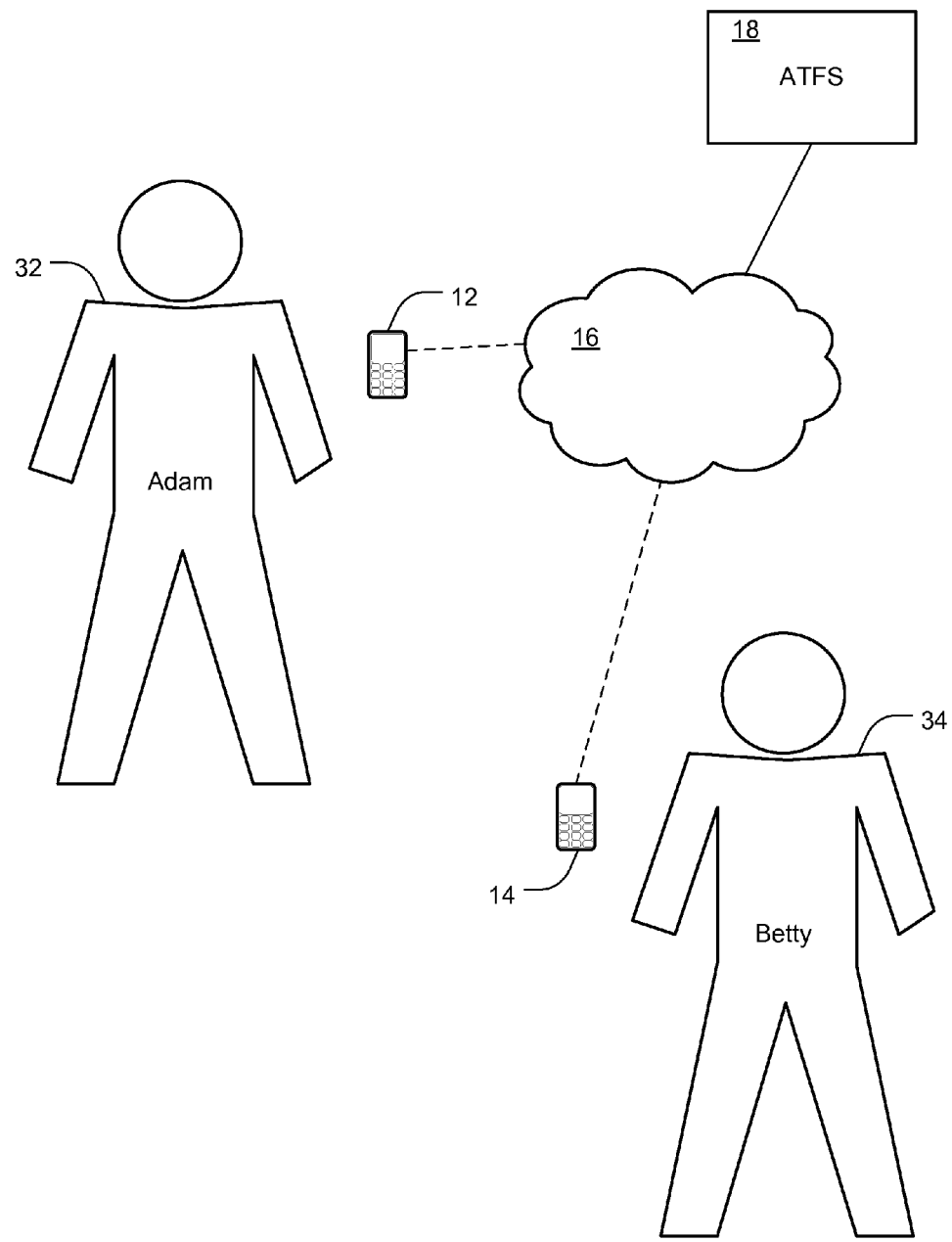
FIG. 2 is a diagram illustrating two users having respectively mobile phones that can be used to communicate back and forth using a portion of the communication system of FIG. 1.
Figure 3:
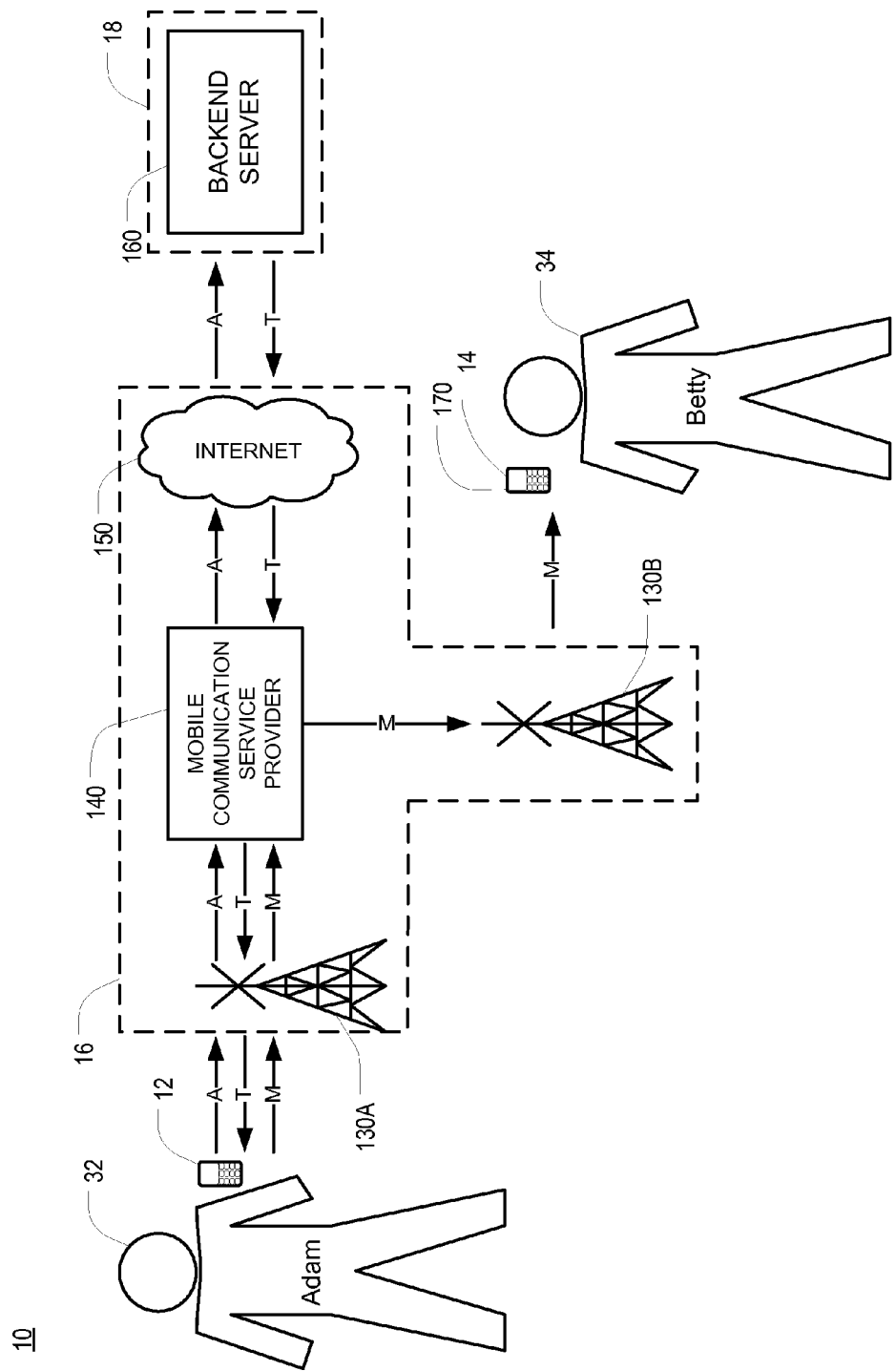
FIG. 3 is a diagram of the portion of the communication system of FIG. 1 over which the users communicate.

FIG. 2 is a diagram illustrating two users 32,34 having respective mobile phones 12,14 that can be used to communicate back and forth using a portion of the communication system of FIG. 1. A more detailed view of the portion of the communication system 10 is illustrated in FIG. 3, which is a diagram of the portion of the communication system of FIG. 1 over which the users 32,34 communicate. As shown therein, a first user 32, sometimes referred to herein as Adam, communicates with a second user 34, sometimes referred to herein as Betty, by way of respective handheld communication devices 12,14. More particularly, Adam and Betty exchange text messages using their mobile phones, each phone having a microphone, a speaker, and a display. In the context of text messaging, mobile phones include text messaging applications when sold at retail, and carriers typically charge a small fee for each text message that is sent. The text messages typically are sent using the short message service (SMS) protocol.

The text messages that are sent preferably are generated by speaking into the mobile phones, with the utterances being converted to text by the ATFS 18 in accordance with the disclosure of U.S. Patent Appl. Pub. No. US 2007/0239837. In such disclosure, the ATFS 18 is implemented in one or more backend servers 160, and the one or more network systems 16 include transceiver towers 130; one or more mobile communication service providers 140; and the Internet 150.

In operation, one or more transceiver towers 130A receive from the mobile phone 12 a message that includes audio data representing a recorded utterance (A). The message (A) is transmitted from the towers 130A to a mobile communication service provider 140 and then over the internet 150 to the ATFS 18 and, specifically, to a backend server 160 that performs the transcription of the recorded utterance. The transcription may be filtered in accordance with the disclosure of U.S. Patent Appl. Pub. No. US 2007/0239837 so as to include abbreviations and other jargon typically used in text messaging. Once transcribed and filtered, a message that includes the recorded utterance, now converted to text (T), is sent back to the mobile phone 12. In particular, the message (T) is sent over the Internet 150, to the mobile communication service provider 140, over the towers 130A, and to the mobile device 12.

Once received by the mobile phone 12, the transcribed and filtered text is reviewable by Adam for proofing and correction. Once verified, the text is sent in a text message (M) to Betty by sending the message (T) over the towers 130A, to the mobile communication service provider 140, then over the towers 130B and, ultimately, to the mobile phone 14. Furthermore, it should be noted that in this and the following examples, it is assumed that Adam and Betty utilize the same mobile communication service provider 140; in the alternative, it will be appreciated that a second mobile communication service provider could be inserted in this path after the first mobile phone service provider.

The messages may be displayed individually or as part of a text conversation. FIG. 4 is a transcription of a chronological sequence of communications, between the two users 12,14, that transpires using the mobile phones 12,14 and the portion of the communication system 10 shown in FIG. 3, and FIG. 5 is a graphical illustration of this chronological sequence of communications of FIG. 4 as it might appear on a display of an instant messaging (IM) client on one of the users' mobile phones 12,14. In accordance with the present invention, certain words are highlighted in the display when the text of communications are displayed in order to draw attention to those words relative to other displayed words. The words that are highlighted represent words for which additional content may be selected for presentation to a user, such as by display or otherwise, the additional content relating in some manner to the highlighted word. Moreover, the additional content presented may be audio (and thus played); visual (and thus displayed); or audiovisual (and thus the audio portion played and the visual portion displayed).

Thus, for example, as shown in the graphical illustration of FIG. 4, the words "sushi" and "movies" are "highlighted" by being shown underlined and in bold on the phone's display. As used herein with reference to preferred embodiments, "word" (sometimes "keyword") generally means a single word or a phrase, i.e., a collection of words, and may be an alphanumeric string, including alphanumeric strings commonly used in text messaging and instant messaging (sometimes "textspeak"). Moreover, as used herein with reference to preferred embodiments, "highlighted" (sometimes "activated") generally means a word having an attribute that is different from most other words with which it is displayed for purposes of drawing a person's attention to that word when displayed with the other words. Highlighting is setting the attribute of such word so that it is highlighted. Of course, other forms of highlighting, including varying font size and/or color, background highlighting, animated effects (e.g., blinking) or the like may likewise be utilized singularly or in combination.

Figure 6:
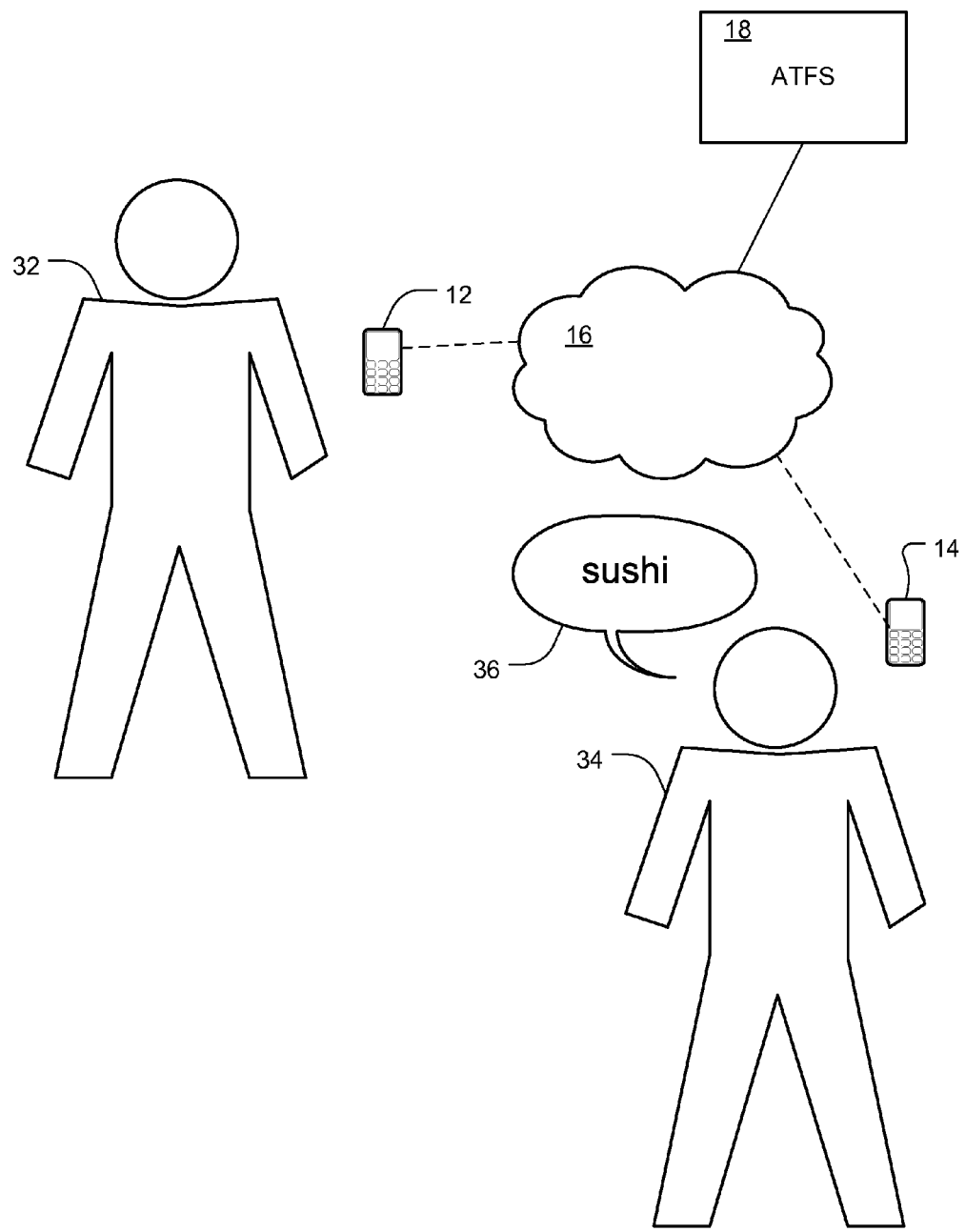
FIG. 6 is a diagram illustrating the second user utilizing a "voice click" feature in accordance with a preferred embodiment of the invention.
Figure 7:
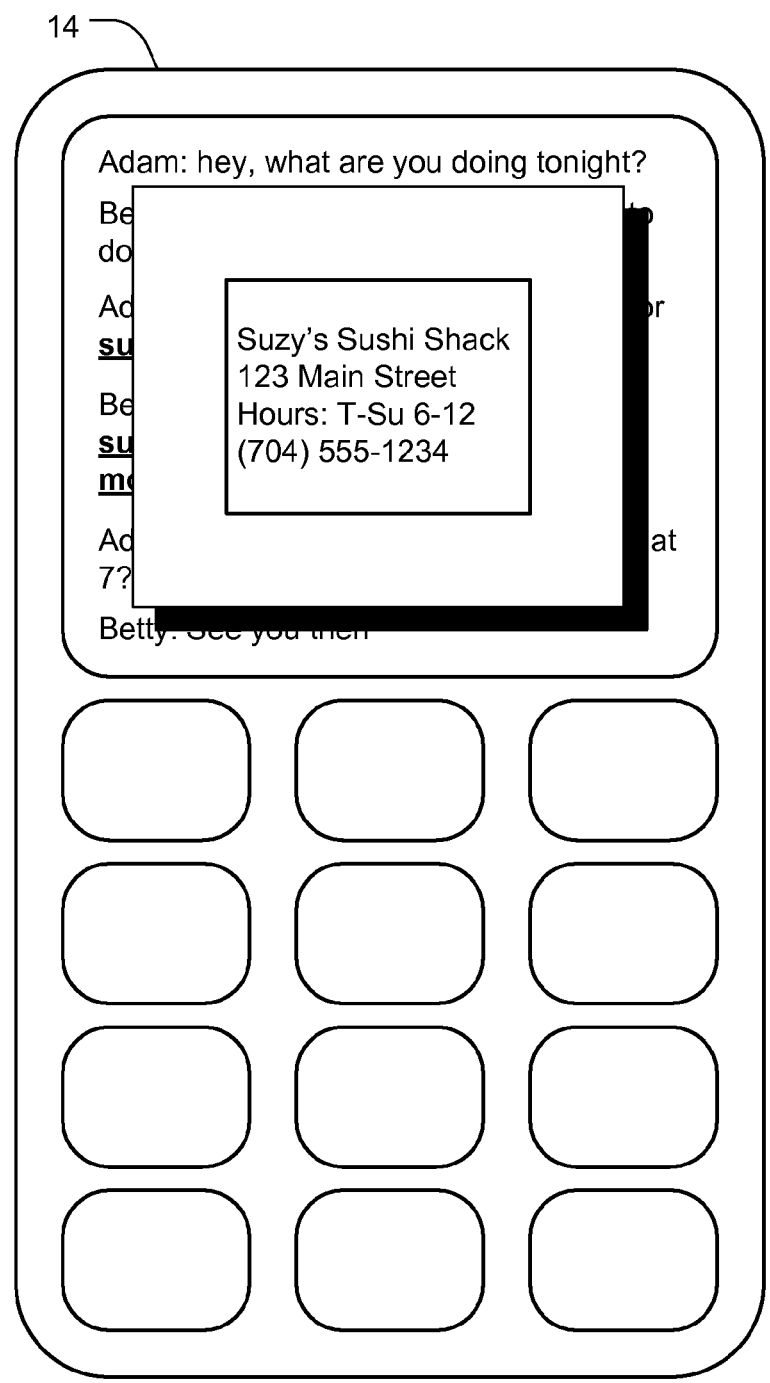
FIG. 7 is a is graphical illustration of the result of the second user utilizing the "voice click" feature as it might appear on the user's mobile phone.

In further accordance with preferred embodiments of the invention, and as further described in greater detail hereinbelow, the highlighted words are words for which additional content has been identified for display or other presentation to the user, such as by display or otherwise, and highlighted words may be selected by a user, with the selection of a highlighted word resulting in the display of the respective additional content for the highlighted word. For example, FIG. 6 illustrates Betty speaking "sushi" into her mobile phone 14 for purposes of selecting the highlighted word "sushi." In response, a pop-up, browser window or the like opens on the display of the mobile phone 14. For example, FIG. 7 is a graphical illustration of a pop-up, displayed in response to Betty's utterance, that provides information about "Suzy's Sushi Shack" restaurant. In the illustration, the information includes the address, operating hours, and phone number, but any information or other content data may alternatively or additionally be provided. In a further feature, the information may be tailored based, in part, on the location of Betty's mobile phone 14, whereby the location of the information (such as a particular nearby restaurant) will be close in proximity to Betty's location. This may be facilitated when Betty's phone includes GPS capabilities, and Betty's location is communicated by her mobile phone, either with an utterance or otherwise.

The highlighting and provision of the additional content for display can be accomplished through various implementations of preferred embodiments of the invention. Accordingly, six different implementations are now described, in any of which the foregoing exemplary scenario is enabled.

In each case, one or more system elements are equipped to carry out one or more functions pertaining to the process of identifying words in the text message for which content is available and/or of determining the circumstances under which the content is to be made available. Sub-functions that may be utilized include, but are not limited to: screening the message to identify the set of words that are to be considered for activation/highlighting; determining the content sources from which possible content is to be sought; and using additional data, in combination or association with the words themselves, to more precisely control the content/content data to be associated with each activated/highlighted word. Furthermore, user preferences, some of which are described herein, may be incorporated into one or more of these functions. Further details of these various functions are provided below.

For each message, there may be one or more words for which content data is to be sought. Although it is possible for every word in the message to be considered for content association, it may be preferable for one or more of the words to be removed from consideration, thereby improving performance by reducing the number of words and by reducing the amount of irrelevant content data that is ultimately returned to the user. These words may be identified in one or more ways. For example, certain very common words, including prepositions and articles, are preferably removed from consideration (except perhaps if included within a longer phrase), may be removed as being too common for any meaningful content to be associated therewith. Other more sophisticated techniques may likewise be applied to reduce the words under consideration. In a simple example, the only words considered for further content association may be the terms which are capitalized. Still further, combinations of words (phrases) may be considered, or only single words may be considered, and in each case, textspeak may or may not be considered. In at least one embodiment, these various possibilities are established only by the system owner or implementer and may not be varied by the user. In at least one other embodiment, however, one or more of these parameters are user preferences that pertain only to a specific user and that may be set and adjusted by that user. For example, each user could control, via preference settings, whether capitalized terms or all terms are considered for additional content, or whether single words, phrases of a certain length, or textspeak are considered for additional content. User preferences may be established directly via the client application in the device 12,14, indirectly via a web application, or both.

In seeking content data to be associated with the words identified for consideration according to one or more of the techniques described above, the system may utilize a variety of data sources. In at least one embodiment, a search is conducted of each selected word (including each identified single word, phrase, or textspeak word) using a general search of the Internet using a search engine such as that provided by Google, Yahoo!, or Microsoft. In at least one other embodiment, such a search is conducted using only particular databases. For example, a search may be conducted in a movie database, local directory, sports database, or the like for each word that is selected as described above. In another example, the searching includes sending a keyword to a third party SMS service and analyzing the results provided in response thereto; in this regard, assuming additional content is found, the additional content data comprises a keyword for thereafter sending to a third party SMS service, in response to which is provided the additional content. A well known and free SMS service is provided by Google, further information about which can be found at http://www.google.com/intl/en_us/mobile/default/sms/index.html.

In addition to the type of conventional searching described above, in at least one embodiment, a database of particular words is maintained by the service provider. More particularly, particular words of interest are listed in a database together with any content data which an interested party has an interest in being associated with the particular word. For example, a movie theater chain, a movie theater chain, a particular movie theater, a film studio, a movie distributor or a video store may have an interest in particular information relating to their respective business being associated with every occurrence of the word "movie" in a message, such that that information is provided as content data when selected by a user. In the illustrated example, Suzy's Sushi Shack may have an interest in brief information about a specific restaurant being associated with the word "sushi," such that selection of the word "sushi" as shown in FIG. 6 causes information to be presented to the user as shown in FIG. 7.

User preferences may once again be utilized in this regard. For example, a user may be able to select types of information, for example from a list, that the user might be interested in. Such categories may include but are not limited to "movies," "dining," "retail stores," and the like. In such an arrangement, the word "sushi" might not be activated or highlighted if the user does not have "dining" or any other category selected for association with additional content.

Additional data may also be combined with any of the foregoing. For example, the location of one or both devices 12,14, available via GPS enablement and the like, may be taken into consideration. Thus, a movie theater chain may have an interest in having information about the movie theater, in the chain, that is geographically closest to the device 12,14 being associated with the word "movie," and Suzy's Sushi Shack, which may only have one location, may have an interest in having information about its single restaurant being associated with the word "sushi" only if the device is within a predetermined distance from that location. User preferences may be utilized here as well, for example to control the distance (radius) within which the user has an interest in associated information.

Other searches that may be performed include a search, for a particular movie, of movie listings for a theater that is nearby the location of the mobile phone; a search, for a particular business name or for a particular category, of business listings that are proximate the location of the mobile phone; a search of song titles for a particular song; a search of book titled for a particular book; a search of stock ticker symbols for a particular stock ticker symbol; a search of sports teams and scores for a particular sports team; a search of a map for an image or directions for a particular address or zip code; and a search of flight information for a particular flight.

Figure 8A:
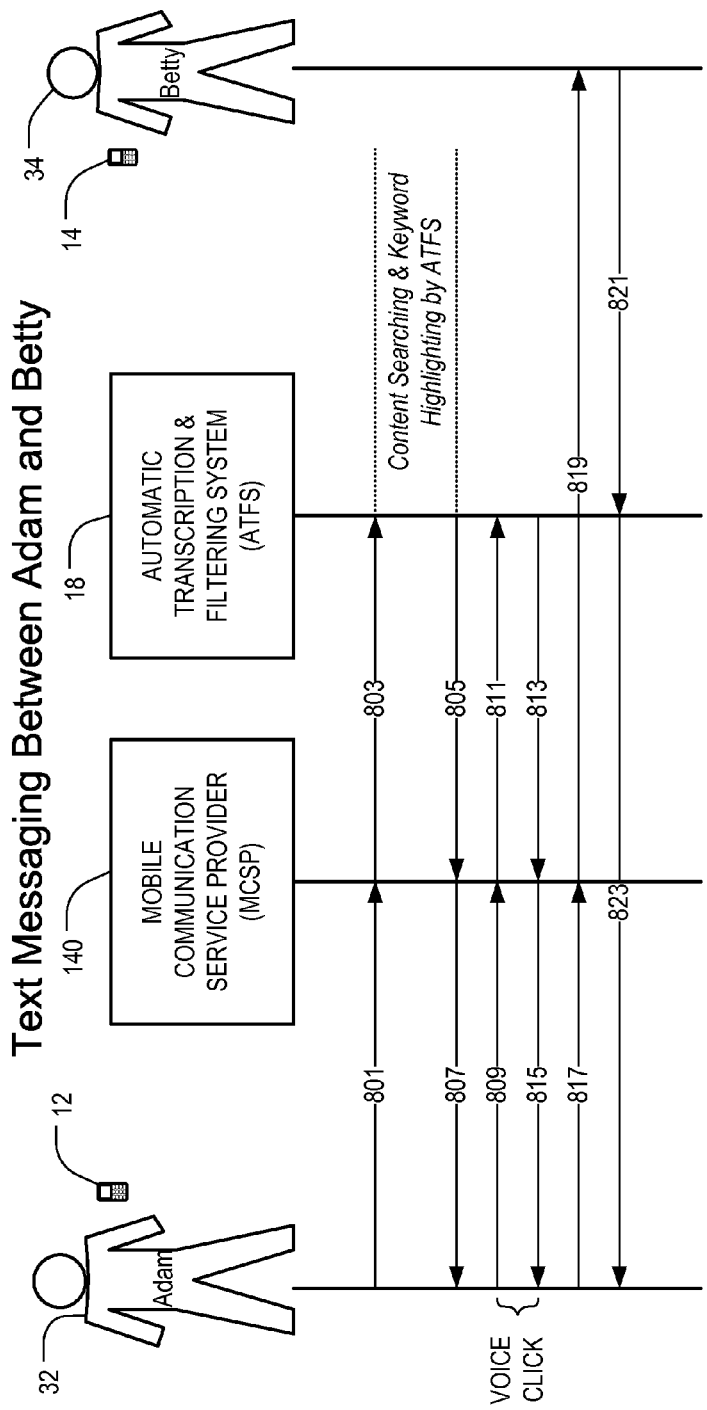
FIG. 8A is a graphical illustration showing the sequence of messages in a preferred implementation of the invention, wherein content searching and keyword highlighting are performed by the ATFS in the portion of the communication system of FIG. 3.
Figure 8B:
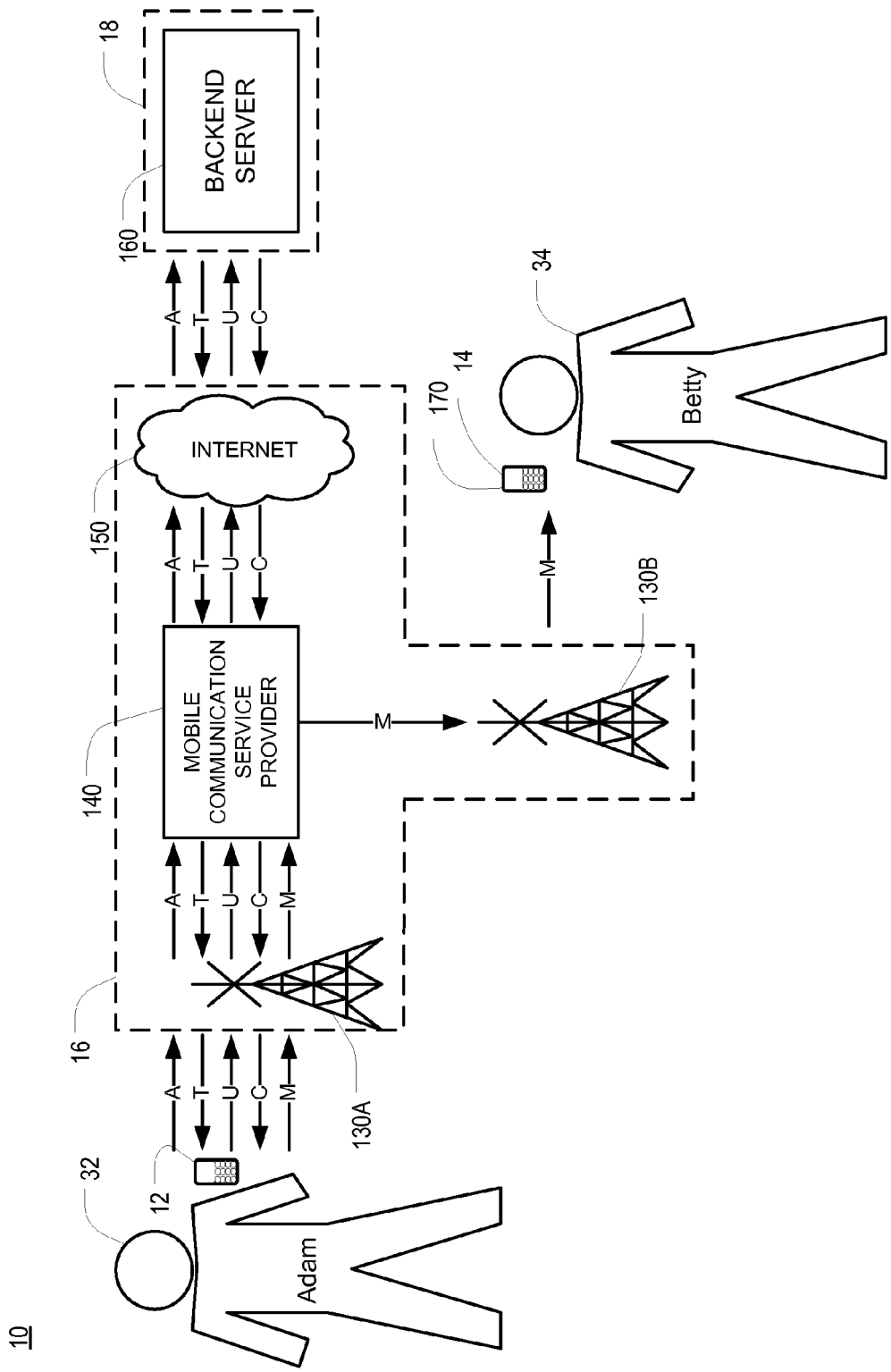
FIG. 8B is a diagram of the portion of the communication system of FIG. 3 over which the sequence of messages are communicated in FIG. 8A.
Figure 9:
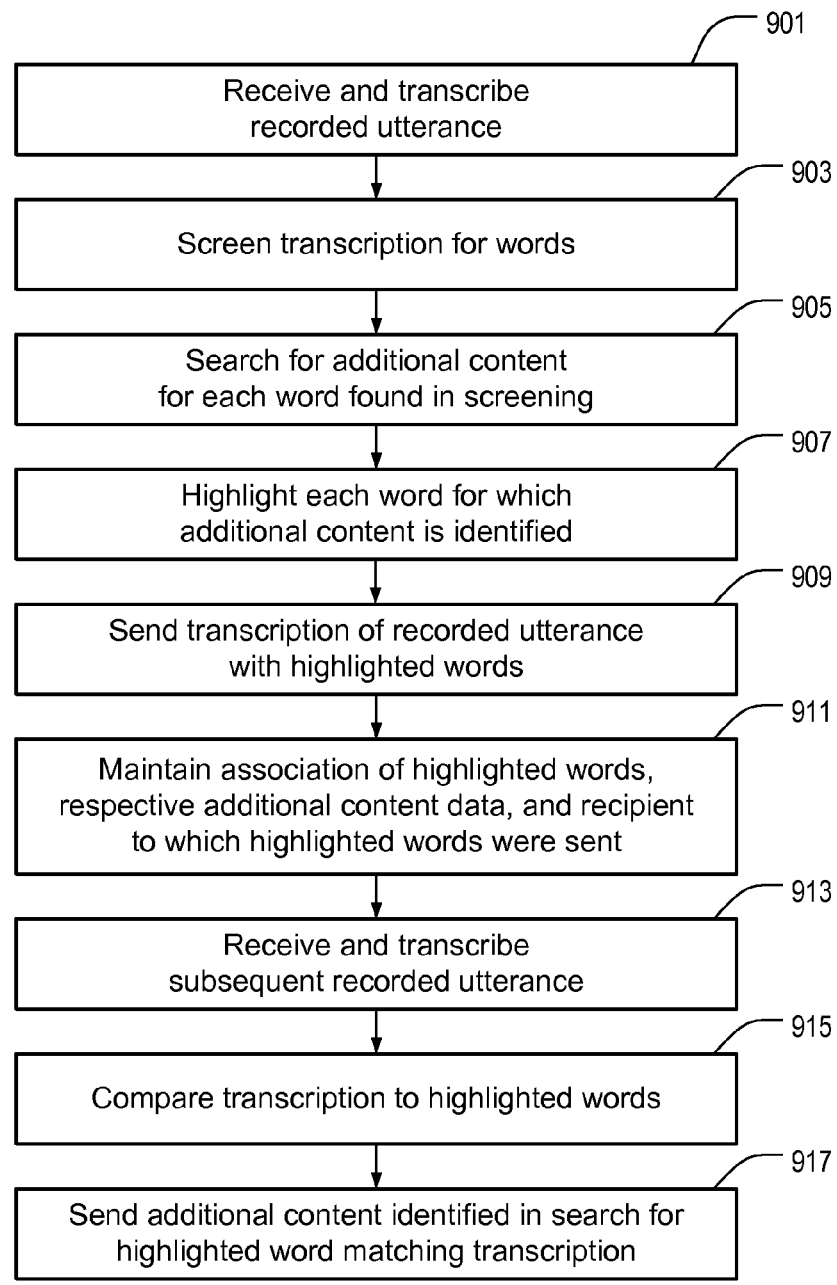
FIG. 9 is a flowchart of steps in a method performed by the ATFS in accordance with the preferred implementation of FIG. 8A.

In accordance with a first preferred embodiment, the two users 12,14 (generally referred to hereinafter only as "Adam" and "Betty" for convenience) communicate using text messaging with their mobile phones 12,14. Furthermore, Adam uses the ATFS 18 so that he may text Betty without typing in the text of his text messages. Such an embodiment is next discussed with reference to FIGS. 8A, 8B, and 9, wherein FIG. 8A is a graphical illustration showing the sequence of messages in a preferred implementation of the invention, wherein content searching and keyword highlighting are performed by the ATFS 18 in the portion of the communication system 10 of FIG. 3; FIG. 8B is a diagram of the portion of the communication system of FIG. 3 over which the sequence of messages are communicated in FIG. 8A; and FIG. 9 is a flowchart of steps in a method performed by the ATFS 18 in accordance with the preferred implementation of FIG. 8A.

As shown therein, Adam utters a message to be sent to Betty. The utterance is recorded in the form of audio data (A) and is communicated 801 over networks 16 in system 10 to a mobile communication service provider 140 and then communicated 803 via the Internet 150 to the ATFS 18, which is implemented by one or more servers 160 (collectively and singly referred to herein as a "server"). In accordance with this implementation, the ATFS 18 receives and transcribes 901 the recorded utterance from Adam and screens 903 the transcription for words that are appropriate for highlighting according to one or more of the techniques described previously (e.g., words like "the" and "a" are preferably not considered appropriate for highlighting; phrases may also be identified during screening, as opposed to consideration of just single words; user preferences may be taken into account, etc.).

For each word found in the screening 903, the ATFS 18 searches 905 for additional content. Furthermore, the search preferably results in only "meaningful" additional content based on intelligent algorithms and relevance scoring. Those words for which additional content is found in the search are then highlighted 907 by the ATFS 18, and the transcribed and filtered text (T)—including the highlighted keywords— is communicated 805 to the mobile communication service provider 140 and then communicated 807 to Adam's mobile phone 12. Additionally, the ATFS 18 maintains 911 an association of the highlighted words, additional content data for the respective additional content identified in the search for each of the respective screened words, and an identifier of the recipient (e.g., Adam's phone 12) to which the highlighted words were sent 909.

Thereafter, when a subsequent recorded utterance (U) from Adam's phone 12 is communicated 809,811 and received and transcribed to text 913, the transcription is compared to the highlighted words that are maintained in association with the identifier for Adam's phone 12. Upon a match, it is determined that one of the highlighted words has been selected by Adam for display of the additional content on Adam's phone. Consequently, the additional content data (C) maintained in association with the highlighted word of the match is sent 917 to Adam's mobile phone 12 for display of the additional content on Adam's mobile phone 12. The additional content data (C) may comprise the additional content for display or, preferably, the additional content data comprises an Internet web address. The additional content data is communicated 813,815 to Adam's mobile phone 12, whereby, upon receipt, the mobile phone 12 is controlled to present content to the user. In this regard, it will be appreciated that if the content data includes a web address (e.g., www.suzysushi.com), such address may be passed to the web browser application of the mobile phone 12 for display of the web page via the web browser. As shown in the message sequence of FIG. 8A, Adam then sends 817,819 a text message to Betty, and Betty may respond 821,823 with a text message of her own.

As used herein with reference to preferred embodiments, "additional content" is intended to mean information that is associated with a highlighted word and that is not necessarily displayed when the highlighted word is displayed, but that is displayed when the highlighted word is selected for display. In contrast, as used herein with reference to preferred embodiments, "additional content data" generally means a pointer, such as a URL, whereat additional content is available for display, but also may mean the additional content itself. Furthermore, as used herein with reference to preferred embodiments, "voice click" is intended to mean the selection of a highlighted word by voice for the intended display of additional information associated with the selected word. Furthermore, it will be appreciated from FIG. 8A that Adam utilizes the "voice click" feature of the invention in this illustration and that Betty does not utilize the "voice click" feature in this illustration.

Figure 10:
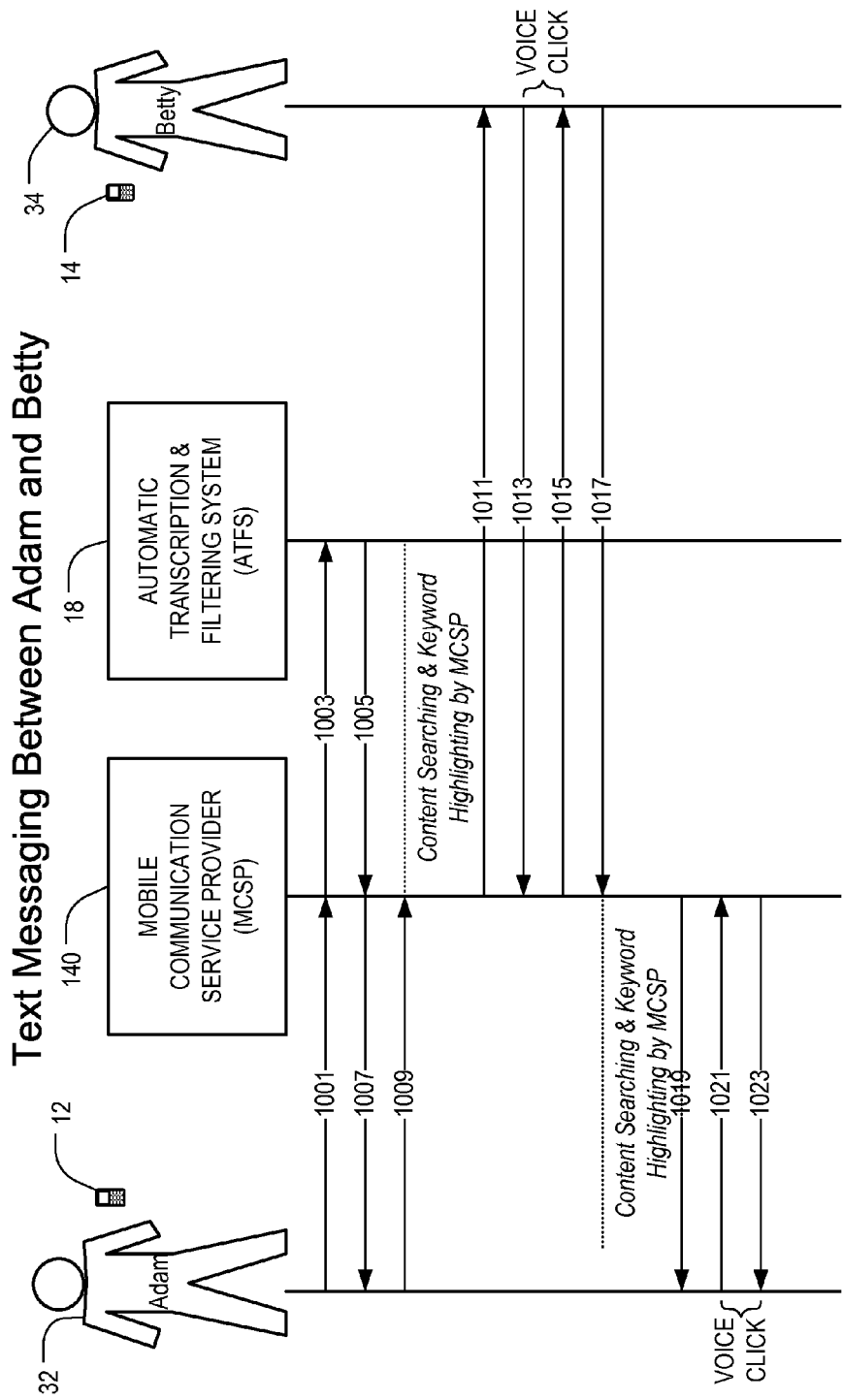
FIG. 10 is a graphical illustration showing the sequence of text messages in another preferred implementation of the invention, wherein content searching and keyword highlighting are performed by the ATFS and the mobile communication service provider in the portion of the communication system of FIG. 3.
Figure 11:
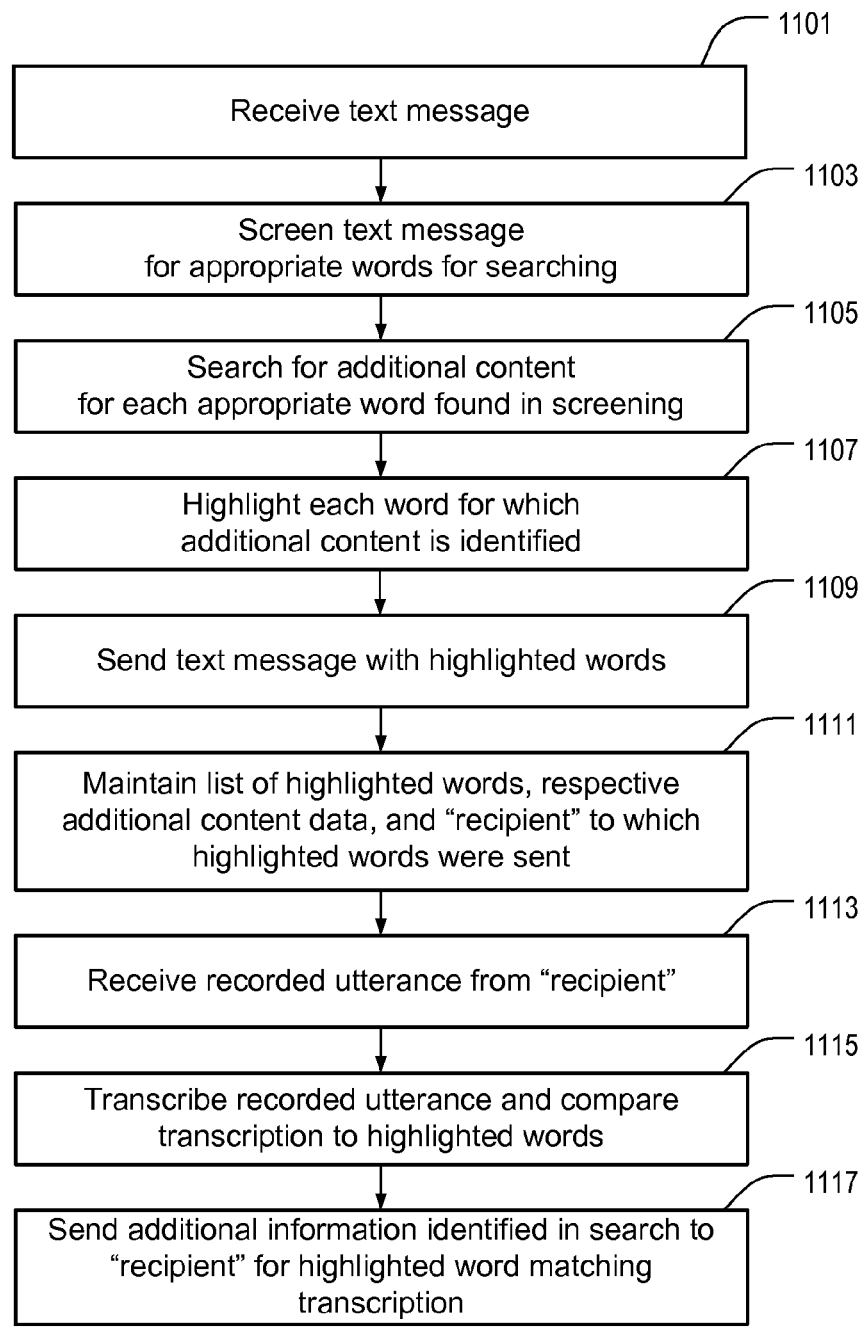
FIG. 11 is a flowchart of steps in a method performed by the mobile communication service provider in accordance with the preferred implementation of FIG. 10.

Another implementation in accordance with a preferred embodiment of the invention is described with reference now to FIGS. 10-11, wherein FIG. 10 is a graphical illustration showing the sequence of text messages in such preferred implementation of the invention, wherein content searching and keyword highlighting are performed by the ATFS 18 and the mobile communication service provider 140 in the portion of the communication system 10 of FIG. 3; FIG. 11 is a flowchart of steps in a method performed by the mobile communication service provider 140 in accordance with the preferred implementation of FIG. 10. Similar to the communication of FIGS. 8A, 8B and 9, Adam and Betty communicate using text messaging with their mobile phones 12,14. Furthermore, Adam uses the ATFS 18 so that he may text Betty without typing in the text of his text messages.

Specifically, as illustrated Adam first utters a message to be sent to Betty. The utterance is recorded in the form of audio data and is communicated 1001 to mobile communication service provider 140 and then communicated 1003 to the ATFS 18. The utterance is transcribed to text by the ATFS 18 and then communicated 1005,1007 back to Adam's phone 12. This part of the sequence is in accordance with the disclosure of U.S. Patent Appl. Publ. No. 2007/0239837.

Adam next sends 1009 the transcribed text in a text message. In accordance with this implementation, the mobile communication service provider 140 receives 1101 and screens 1103 the text message for appropriate words for searching. For each appropriate word found in the screening 1103, the mobile communication service provider 140 searches 1105 for additional content.

Furthermore, the search preferably results in only "meaningful" additional content based on intelligent algorithms and relevance scoring. Those words for which additional content is found in the search are then highlighted 1107 by the mobile communication service provider 140. The text message, including the highlighted keywords, is then communicated 1011 to Betty's mobile phone 14. Additionally, the mobile communication service provider 140 maintains 1111 an association of the highlighted words, additional content data for the respective additional content identified in the search for each of the respective words identified in the screening, and an identifier of the recipient (e.g., Betty's phone 14) to which the highlighted words were sent 1109.

Thereafter, a subsequent recorded utterance from Betty's phone 14 may be communicated 1013 and received 1113 and transcribed 1115 to text by the mobile communication service provider 140, whereupon the transcription is compared 1115 to the highlighted words that are maintained in association with the identifier for Betty's phone 14. Upon a match, it is determined that one of the highlighted words has been selected by Betty for display of the additional content on Betty's phone 14. Consequently, the additional content data maintained in association with the highlighted word of the match is sent 1117 to Betty's mobile phone 14 for display of the additional content on Betty's mobile phone 14. The additional content data (C) may comprise the additional content for display or, preferably, the additional content data comprises an Internet web address. The additional content data is communicated to Betty's mobile phone 14, whereby, upon receipt, the mobile phone 14 is controlled to present content to the user. In this regard, it will be appreciated that if the content data includes a web address (e.g., www.suzysushi.com), such address may be passed to the web browser application of the mobile phone 14 for display of the web page via the web browser.

It will be appreciated that in this implementation, the mobile communication service provider 140 may utilize the same technology as the ATFS 18 (i.e., the mobile communication service provider 140 may itself include an ASR engine and other components found in the ATFS 18) in receiving, transcribing, and comparing an utterance to highlighted words taken from messages for which words additional content has been identified. Moreover, the ability of the mobile communication service provider 140 to do this enables highlighting of words in text messages from Betty to Adam even when Betty manually types the text messages on her mobile phone 14.

For example, as shown in the message sequence of FIG. 10, Betty sends 1017 a text message to Adam. The mobile communication service provider 140 receives and screens the text message from Betty for appropriate words for searching; for each appropriate word, the mobile communication service provider 140 searches for additional content; and those words for which additional content is found in the search are then highlighted. The text message—including the highlighted keywords—is then communicated 1019 to Adam's mobile phone 12. Additionally, the mobile communication service provider 140 maintains an association (preferably in a database) of the highlighted words, additional content data for the respective additional content identified in the search for each of the respective words identified in the screening, and an identifier of Adam's phone 12 to which the highlighted words were communicated 1019.

Thereafter, a subsequent recorded utterance from Adam's phone 12 may be communicated 1021 and received and transcribed to text by the mobile communication service provider 140, whereupon the transcription is compared to the highlighted words that are maintained in association with the identifier for Adam's phone 12. Upon a match, it is determined that one of the highlighted words has been selected by Adam for display of the additional content on Adam's phone 12. Consequently, the additional content data maintained in association with the highlighted word of the match is sent 1023 to Adam's mobile phone 12 for display of the additional content on Adam's mobile phone 12.

Figure 12:
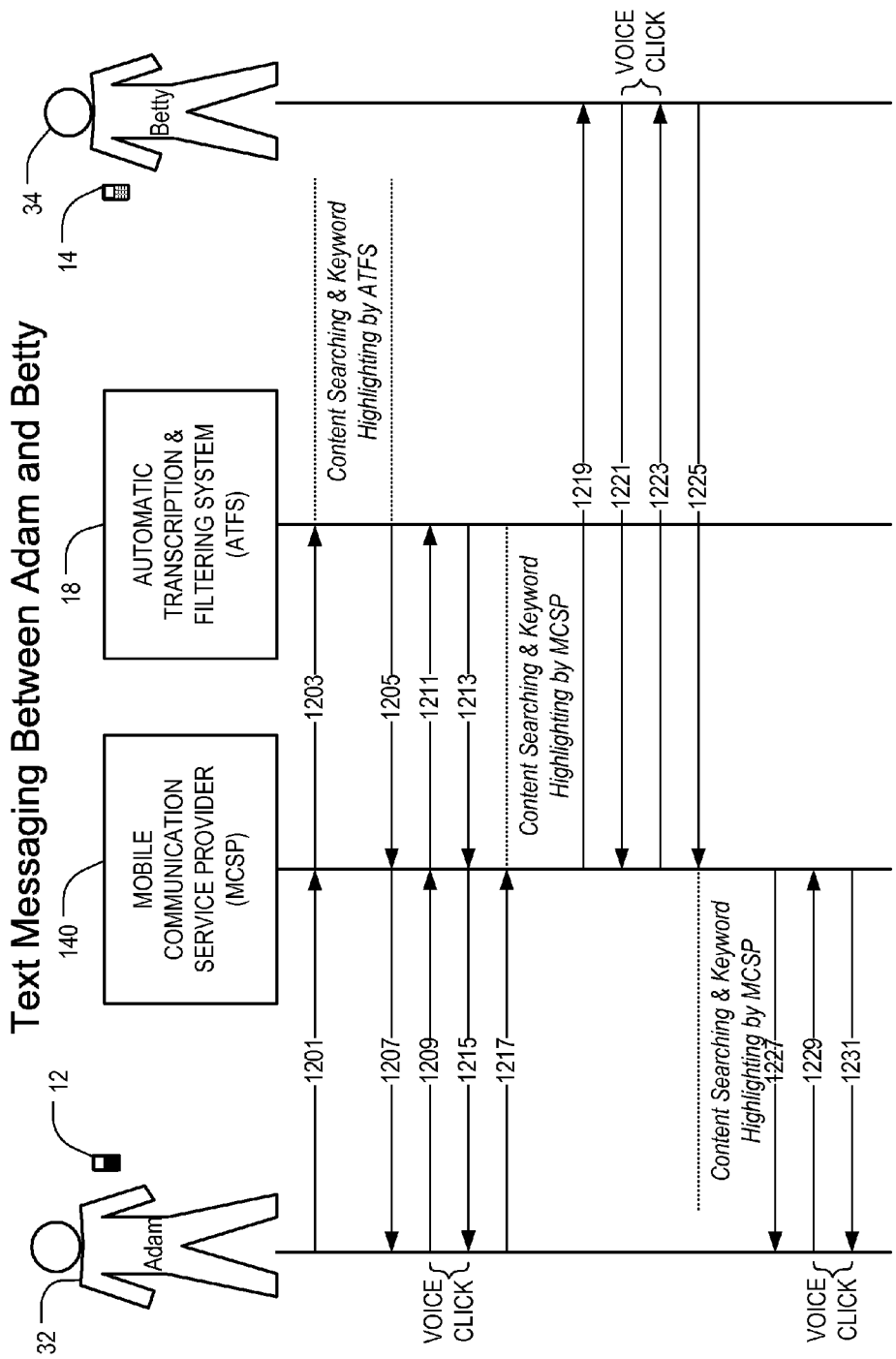
FIG. 12 is a graphical illustration showing the sequence of text messages in yet another preferred implementation of the invention, wherein content searching and keyword highlighting are performed by both the ATFS and the mobile communication service provider in the portion of the communication system of FIG. 3.

A third implementation in which text messaging between Adam and Betty is illustrated is shown in FIG. 12, which simply represents the combination of the first and second implementations, i.e., in this third implementation, both the ATFS 18 and the mobile communication service provider 140 separately and independently support voice clicking. More particularly, FIG. 12 is a graphical illustration showing the sequence of text messages in such an implementation of the invention, wherein content searching and keyword highlighting are performed by both the ATFS 18 and the mobile communication service provider 140 in the portion of the communication system 10 of FIG. 3.

Specifically, Adam utters a message to be sent to Betty. The utterance is recorded in the form of audio data and is communicated 1201 to mobile communication service provider 140 and then communicated 1203 to the ATFS 18. In accordance with this implementation, the ATFS 18 receives and transcribes the recorded utterance from Adam and screens the transcription for words that are appropriate for highlighting.

For each word found in the screening, the ATFS 18 searches for additional content. Furthermore, the search preferably results in only "meaningful" additional content based on intelligent algorithms and relevance scoring. Those words for which additional content is found in the search are then highlighted by the ATFS 18, and the transcribed and filtered text—including the highlighted keywords—are communicated 1205 to the mobile communication service provider 140 and then communicated 1207 to Adam's mobile phone 12. Additionally, the ATFS 18 maintains an association (preferably in a database) of the highlighted words, additional content data for the respective additional content identified in the search for each of the respective screened words, and an identifier of the recipient (e.g., Adam's phone 12) to which the highlighted words were sent.

Thereafter, when a subsequent recorded utterance from Adam's phone 12 is communicated 1209,1211 and received by the ATFS 18 and transcribed to text, the transcription is compared to the highlighted words that are maintained in association with the identifier for Adam's phone 12. Upon a match, it is determined that one of the highlighted words has been selected by Adam for display of the additional content on Adam's phone. Consequently, the additional content data maintained in association with the highlighted word of the match is communicated 1213,1215 to Adam's mobile phone 12 for display of the additional content on Adam's mobile phone 12. The additional content data (C) may comprise the additional content for display or, preferably, the additional content data comprises an Internet web address. The additional content data is communicated to Adam's mobile phone 12, whereby, upon receipt, the mobile phone 12 is controlled to present content to the user. In this regard, it will be appreciated that if the content data includes a web address (e.g., www.suzysushi.com), such address may be passed to the web browser application of the mobile phone 12 for display of the web page via the web browser.

As shown in the message sequence of FIG. 12, Adam then sends 1217 a text message to Betty that includes the transcribed and filtered text received from the ATFS 18, but that does not include the highlighted words. In accordance with this implementation, the mobile communication service provider 140 receives and screens the text message for appropriate words for searching. For each appropriate word found in the screening, the mobile communication service provider 140 searches for additional content.

Furthermore, the search preferably results in only "meaningful" additional content based on intelligent algorithms and relevance scoring. Those words for which additional content is found in the search are then highlighted by the mobile communication service provider 140. The text message—including the highlighted keywords—is then communicated 1219 to Betty's mobile phone 14. Additionally, the mobile communication service provider 140 maintains an association of the highlighted words, additional content data for the respective additional content identified in the search for each of the respective words identified in the screening, and an identifier of the recipient (e.g., Betty's phone 14) to which the highlighted words were sent.

Thereafter, a subsequent recorded utterance from Betty's phone 14 may be communicated 1221 to, and received and transcribed to text by, the mobile communication service provider 140, whereupon the transcription is compared to the highlighted words that are maintained in association with the identifier for Betty's phone 14. Upon a match, it is determined that one of the highlighted words has been selected by Betty for display of the additional content on Betty's phone 14. Consequently, the additional content data maintained in association with the highlighted word of the match is sent to Betty's mobile phone 14 for display of the additional content on Betty's mobile phone 14. The additional content data (C) may comprise the additional content for display or, preferably, the additional content data comprises an Internet web address. The additional content data is communicated 1223 to Betty's mobile phone 14, whereby, upon receipt, the mobile phone 14 is controlled to present content to the user. In this regard, it will be appreciated that if the content data includes a web address (e.g., www.suzysushi.com), such address may be passed to the web browser application of the mobile phone 14 for display of the web page via the web browser.

It will be appreciated that in this implementation, the mobile communication service provider 140 may utilize the same technology as the ATFS 18 in receiving, transcribing, and comparing an utterance to highlighted words taken from messages for which words additional content has been identified. Moreover, the ability of the mobile communication service provider 140 to do this enables highlighting of words in text messages from Betty to Adam even when Betty manually types the text messages on her mobile phone 14.

For example, as shown in the message sequence of FIG. 10, Betty sends 1225 a text message to Adam. The mobile communication service provider 140 receives and screens the text message from Betty for appropriate words for searching; for each appropriate word, the mobile communication service provider 140 searches for additional content; and those words for which additional content is found in the search are then highlighted. The text message—including the highlighted keywords—is then communicated 1227 to Adam's mobile phone 12. Additionally, the mobile communication service provider 140 maintains an association (preferably in a database) of the highlighted words, additional content data for the respective additional content identified in the search for each of the respective words identified in the screening, and an identifier of Adam's phone 12 to which the highlighted words were communicated 1227.

Thereafter, a subsequent recorded utterance from Adam's phone 12 may be communicated 1229 and received and transcribed to text by the mobile communication service provider 140, whereupon the transcription is compared to the highlighted words that are maintained in association with the identifier for Adam's phone 12. Upon a match, it is determined that one of the highlighted words has been selected by Adam for display of the additional content on Adam's phone 12. Consequently, the additional content data maintained in association with the highlighted word of the match is sent 1231 to Adam's mobile phone 12 for display of the additional content on Adam's mobile phone 12.

Fourth, fifth, and sixth implementations are illustrated, respectively, with reference to FIGS. 13-14, FIGS. 15-16, and FIG. 17. The similarities with the first, second, and third implementations of FIGS. 8-9, 10-11, and 12, respectively, will be appreciated. However, in the fourth, fifth, and sixth implementations, communications between Adam and Betty are effected by instant messaging (IM) using an IM client on each mobile phone 12,14 in communication with an IM client on a server of an IM service provider 240.

Figure 13:
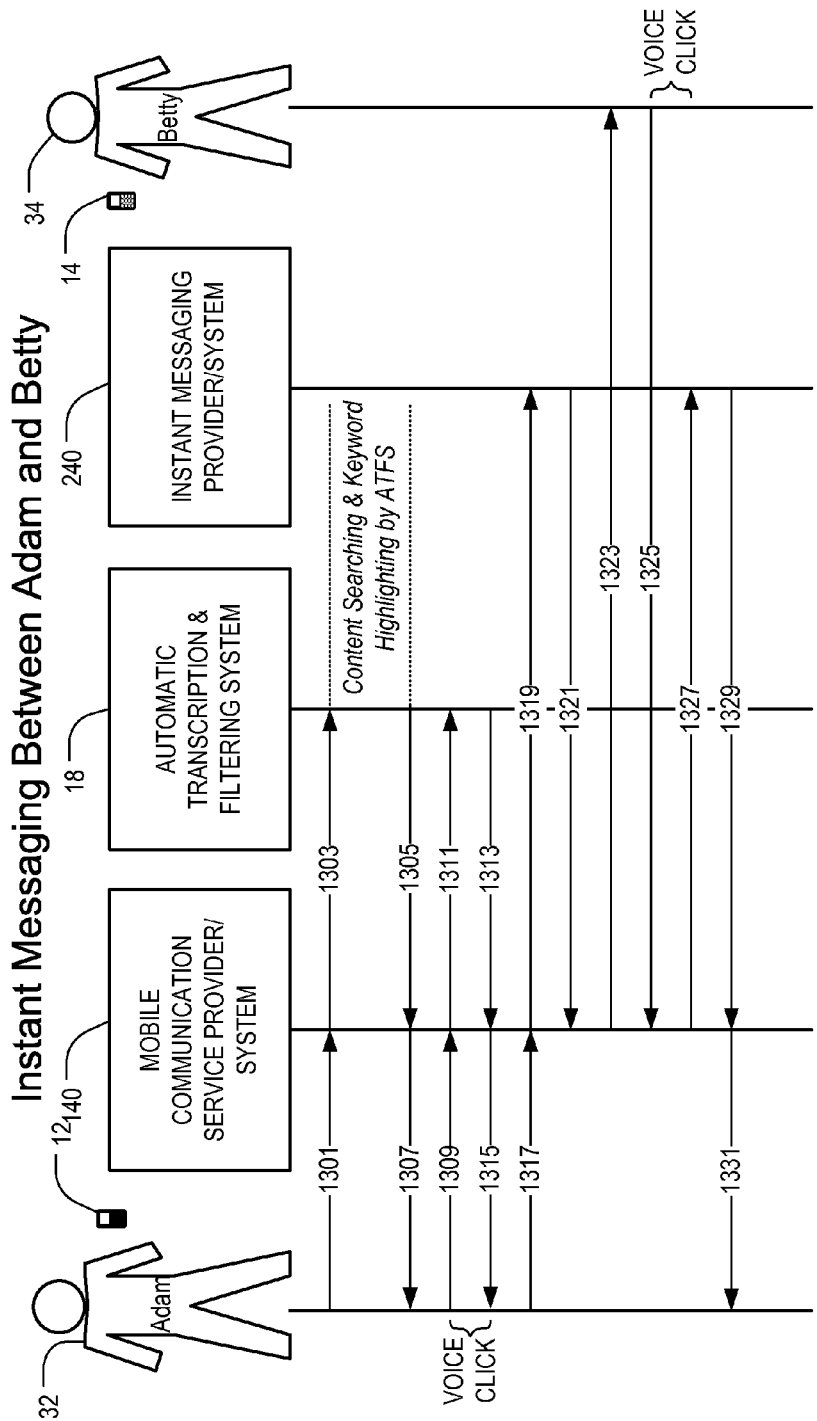
FIG. 13 is a graphical illustration showing the sequence of messages in a preferred implementation of the invention, wherein content searching and keyword highlighting are performed by the ATFS 18 in the portion of the communication system of FIG. 3.
Figure 14:
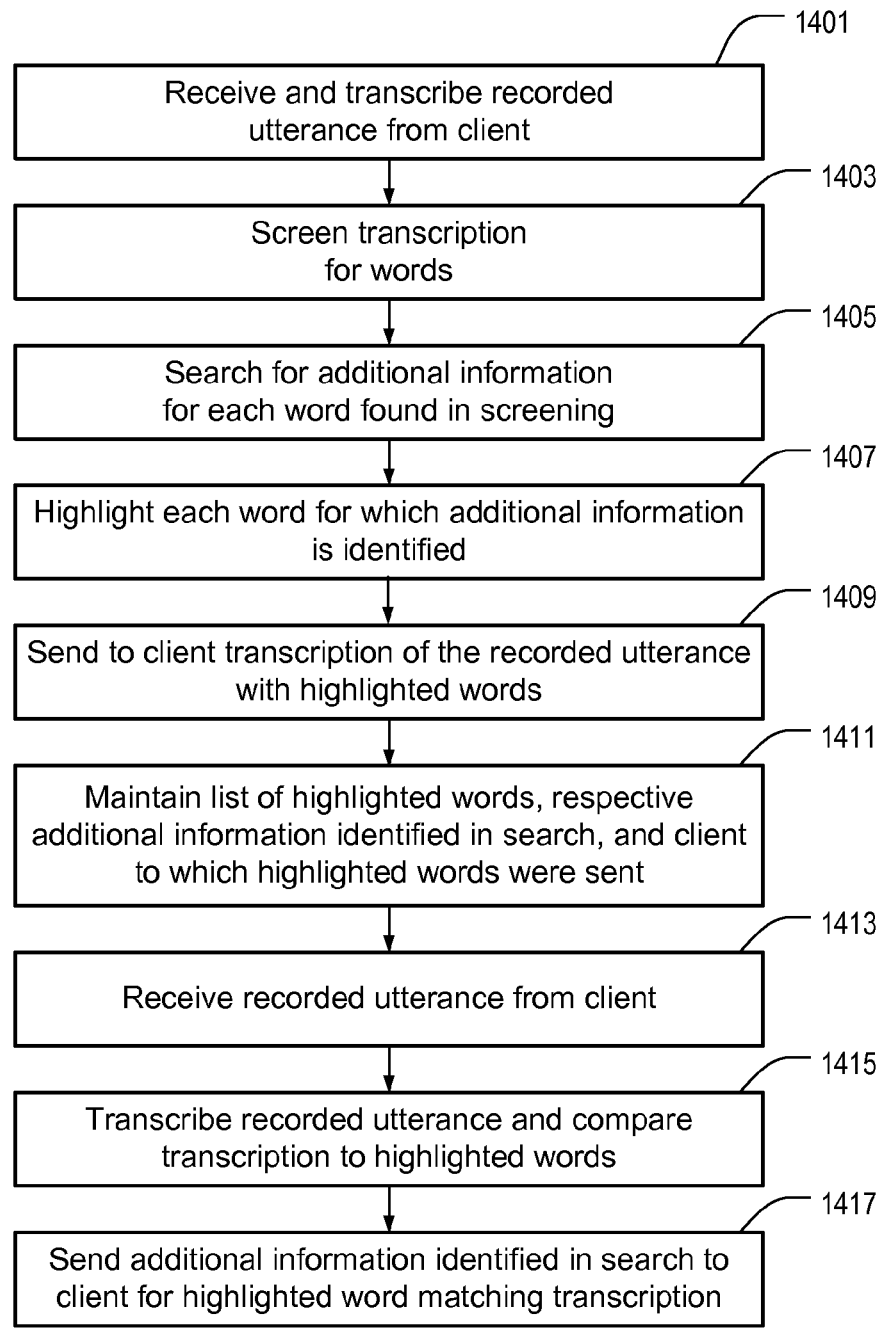
FIG. 14 is a flowchart of steps in a method performed by the ATFS in accordance with the preferred implementation of FIG. 13.

More specifically, in the fourth implementation, the ATFS 18 supports voice clicking, as in the first implementation. FIG. 13 is a graphical illustration showing the sequence of messages in such an implementation of the invention, wherein content searching and keyword highlighting are performed by the ATFS 18 in the portion of the communication system 10 of FIG. 3; and FIG. 14 is a flowchart of steps in a method performed by the ATFS 18 in accordance with the preferred implementation of FIG. 13. As shown in FIGS. 13 and 14, Adam utters a message to be transcribed and sent to Betty. The utterance is recorded in the form of audio data and is communicated 1301 to mobile communication service provider 140 and then communicated 1303 to the ATFS 18. In accordance with this implementation, the ATFS 18 receives and transcribes 1401 the recorded utterance from Adam and screens 1403 the transcription for words that are appropriate for highlighting.

For each word found in the screening 1403, the ATFS 18 searches 1405 for additional content. Furthermore, the search preferably results in only "meaningful" additional content based on intelligent algorithms and relevance scoring. Those words for which additional content is found in the search are then highlighted 1407 by the ATFS 18, and the transcribed and filtered text, including the highlighted keywords, are communicated 1305 to the mobile communication service provider 140 and then communicated 1307 to Adam's mobile phone 12. Additionally, the ATFS 18 maintains 1411 an association of the highlighted words, additional content data for the respective additional content identified in the search for each of the respective screened words, and an identifier of the recipient (e.g., Adam's phone 12) to which the highlighted words were sent 1409.

Thereafter, when a subsequent recorded utterance from Adam's phone 12 is communicated 1309,1311 and received 1413 by the ATFS 18, it is then transcribed to text and compared 1415 to the highlighted words that are maintained in association with the identifier for Adam's phone 12. Upon a match, it is determined that one of the highlighted words has been selected by Adam for display of the additional content on Adam's phone. Consequently, the additional content data maintained in association with the highlighted word of the match is sent 1417 to Adam's mobile phone 12 for display of the additional content on Adam's mobile phone 12. The additional content data (C) may comprise the additional content for display or, preferably, the additional content data comprises an Internet web address. The additional content data is communicated 1313,1315 to Adam's mobile phone 12, whereby, upon receipt, the mobile phone 12 is controlled to present content to the user. In this regard, it will be appreciated that if the content data includes a web address (e.g., www.suzysushi.com), such address may be passed to the web browser application of the mobile phone 12 for display of the web page via the web browser.

As shown in the message sequence of FIG. 13, Adam next sends an instant message intended for Betty, which is communicated 1317,1319 to the IM service provider 240. The instant message from Adam to Betty includes the transcribed and filtered text received from the ATFS 18, but does not include the highlighted words from the ATFS 18. The instant message is communicated 1321 to the mobile communication service provider 140, and then communicated 1323 to Betty's mobile phone 14. In response, Betty sends an instant message intended for Adam, which is communicated 1325,1327 to the IM service provider 240. The instant message is communicated 1329 to the mobile communication service provider 140 and then communicated 1323 to Adam's mobile phone 12.

Figure 15:
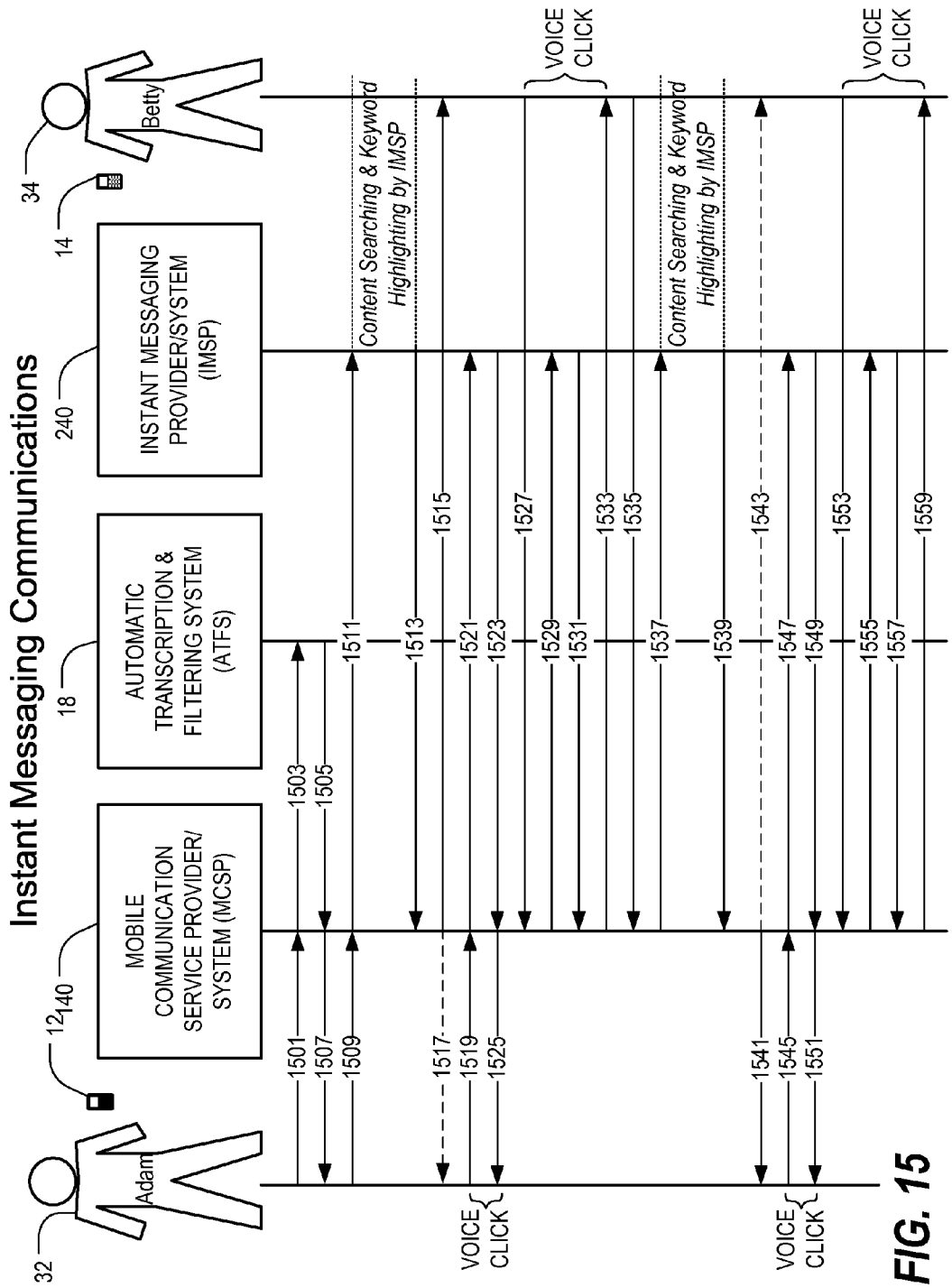
FIG. 15 is a graphical illustration showing the sequence of text messages in another preferred implementation of the invention, wherein content searching and keyword highlighting are performed by the IM service provider in the portion of the communication system of FIG. 3.

In the fifth implementation, like the second implementation, the ATFS 18 does not support voice clicking, which instead is supported by the IM service provider 240. FIG. 15 is a graphical illustration showing the sequence of text messages in such a preferred implementation of the invention, wherein content searching and keyword highlighting are performed by the IM service provider 240 in the portion of the communication system 10 of FIG. 3; and FIG. 16 is a flowchart of steps in a method performed by the IM service provider 240 in accordance with the preferred implementation of FIG. 15.

Figure 16:
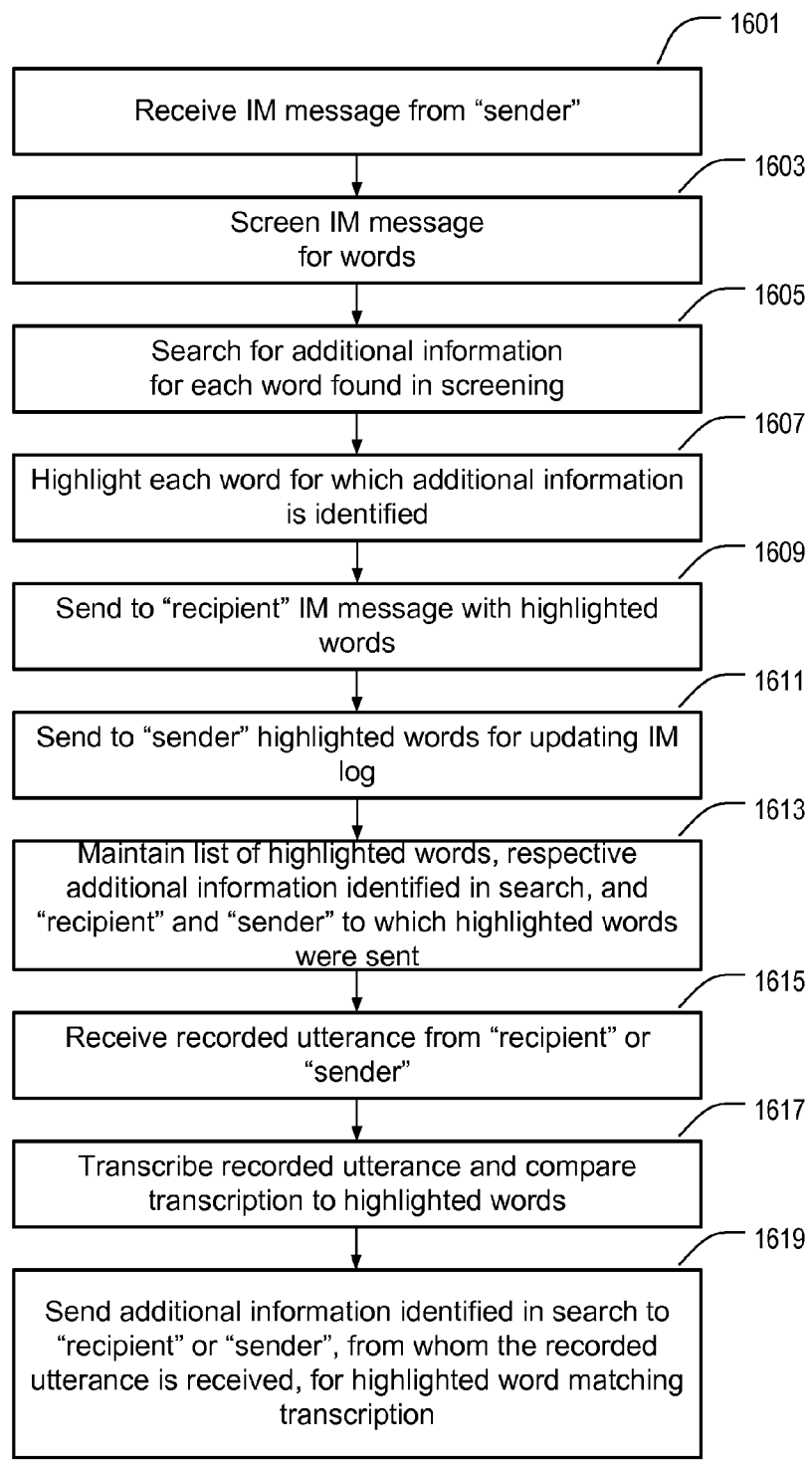
FIG. 16 is a flowchart of steps in a method performed by the IM service provider in accordance with the preferred implementation of FIG. 15.

Specifically, as illustrated in FIGS. 15 and 16, Adam first utters a message to be sent to Betty. The utterance is recorded in the form of audio data and is communicated 1501 to mobile communication service provider 140 and then communicated 1503 to the ATFS 18. The utterance is transcribed to text by the ATFS 18 and then communicated 1505,1507 back to Adam's phone 12. This part of the sequence is in accordance with the disclosure of US Patent Application Publication No. 2007/0239837.

Adam next sends 1509 the transcribed text in an instant message. In accordance with this implementation, the mobile communication service provider 140 communicates 1511 the instant message to the IM service provider 240. The IM service provider 240 receives 1601 and screens 1603 the instant message for appropriate words for searching. For each appropriate word found in the screening 1603, the IM service provider 240 searches 1605 for additional content. Furthermore, the search preferably results in only "meaningful" additional content based on intelligent algorithms and relevance scoring. Those words for which additional content is found in the search are then highlighted 1607 by the IM service provider 140. Preferably, the instant message—including the highlighted keywords—is then communicated 1513 to the mobile communication service provider 140 and, thereafter, is communicated 1515 to the recipient 1609. Additionally, the highlighted keywords also are communicated 1517 to the sender 1611 of the instant message for updating of the log of the sent message with the highlighted words for possible selection thereof by the sender of the instant message, and identifiers of both mobile phones 12,14 preferably are maintained 1613 in association with the highlighted keywords and respective additional content data. Alternatively, the IM service provider 240 communicates the highlighted keywords only to the recipient, and only an identifier of the recipient's mobile phone is maintained in the association.

Thereafter, a subsequent recorded utterance from Adam's phone 12 may be communicated 1519,1521 and received 1615 and transcribed 1617 to text by the IM service provider 240, whereupon the transcription is compared 1617 to the highlighted words that are maintained in association with the identifier for Adam's phone 12. Upon a match, it is determined that one of the highlighted words has been selected for display of the additional content. Consequently, the additional content data maintained in association with the highlighted word of the match is sent 1619 to Adam's phone 12 for display of the additional content. The additional content data is communicated 1523 to the mobile communication service provider 140 and then is communicated 1525 to Adam's phone 12.

In addition, a subsequent recorded utterance from Betty's phone 14 may be communicated 1527,1529 and received 1615 and transcribed 1617 to text by the IM service provider 240, whereupon the transcription is compared 1617 to the highlighted words that are maintained in association with the identifier for Betty's phone 14. Upon a match, it is determined that one of the highlighted words has been selected for display of the additional content. Consequently, the additional content data maintained in association with the highlighted word of the match is sent 1619 to Betty's phone 14 for display of the additional content. The additional content data is communicated 1531 to the mobile communication service provider 140 and then is communicated 1533 to Betty's phone 14.

In each case, the additional content data (C) may comprise the additional content for display or, preferably, the additional content data comprises an Internet web address. The additional content data is communicated to the respective mobile phone 12,14, whereby, upon receipt, the mobile phone 12,14 is controlled to present content to the user. In this regard, it will be appreciated that if the content data includes a web address (e.g., www.suzysushi.com), such address may be passed to the web browser application of the mobile phone 12 for display of the web page via the web browser.

It will be appreciated that in this implementation, the IM service provider 240 may utilize the same technology as the ATFS 18 in receiving, transcribing, and comparing an utterance to highlighted words taken from messages for which words additional content has been identified. Moreover, the ability of the IM service provider 240 to do this enables highlighting of words in instant messages from Betty to Adam even when Betty manually types the text messages on her mobile phone 14.

For example, as shown in the message sequence of FIG. 15, Betty sends an instant message to Adam. The instant message is communicated 1535,1537 to the IM service provider 240. The IM service provider 240 receives and screens the instant message from Betty for appropriate words for searching; for each appropriate word, the IM service provider 240 searches for additional content; and those words for which additional content is found in the search are then highlighted. Preferably, the instant message—including the highlighted keywords—is then communicated 1539 to the mobile communication service provider 140 and, thereafter, both is communicated 1541 to the recipient (Adam), and communicated 1543 to the sender (Betty) for updating of the log of the sent message on Betty's phone with the highlighted words. Identifiers of both mobile phones 12,14 preferably are maintained in association with the highlighted keywords and respective additional content data.

Thereafter, a subsequent recorded utterance from Adam's phone 12 may be communicated 1545,1547 and received and transcribed to text by the IM service provider 240, whereupon the transcription is compared to the highlighted words that are maintained in association with the identifier for Adam's phone 12. Upon a match, it is determined that one of the highlighted words has been selected for display of the additional content. Consequently, the additional content data maintained in association with the highlighted word of the match is sent to Adam's phone 12 for display of the additional content. The additional content data is communicated 1549 to the mobile communication service provider 140 and then is communicated 1551 to Adam's phone 12.

In addition, a subsequent recorded utterance from Betty's phone 14 may be communicated 1553,1555 and received and transcribed to text by the IM service provider 240, whereupon the transcription is compared to the highlighted words that are maintained in association with the identifier for Betty's phone 14. Upon a match, it is determined that one of the highlighted words has been selected for display of the additional content. Consequently, the additional content data maintained in association with the highlighted word of the match is sent to Betty's phone 14 for display of the additional content. The additional content data is communicated 1557 to the mobile communication service provider 140 and then is communicated 1559 to Betty's phone 14.

Figure 17:
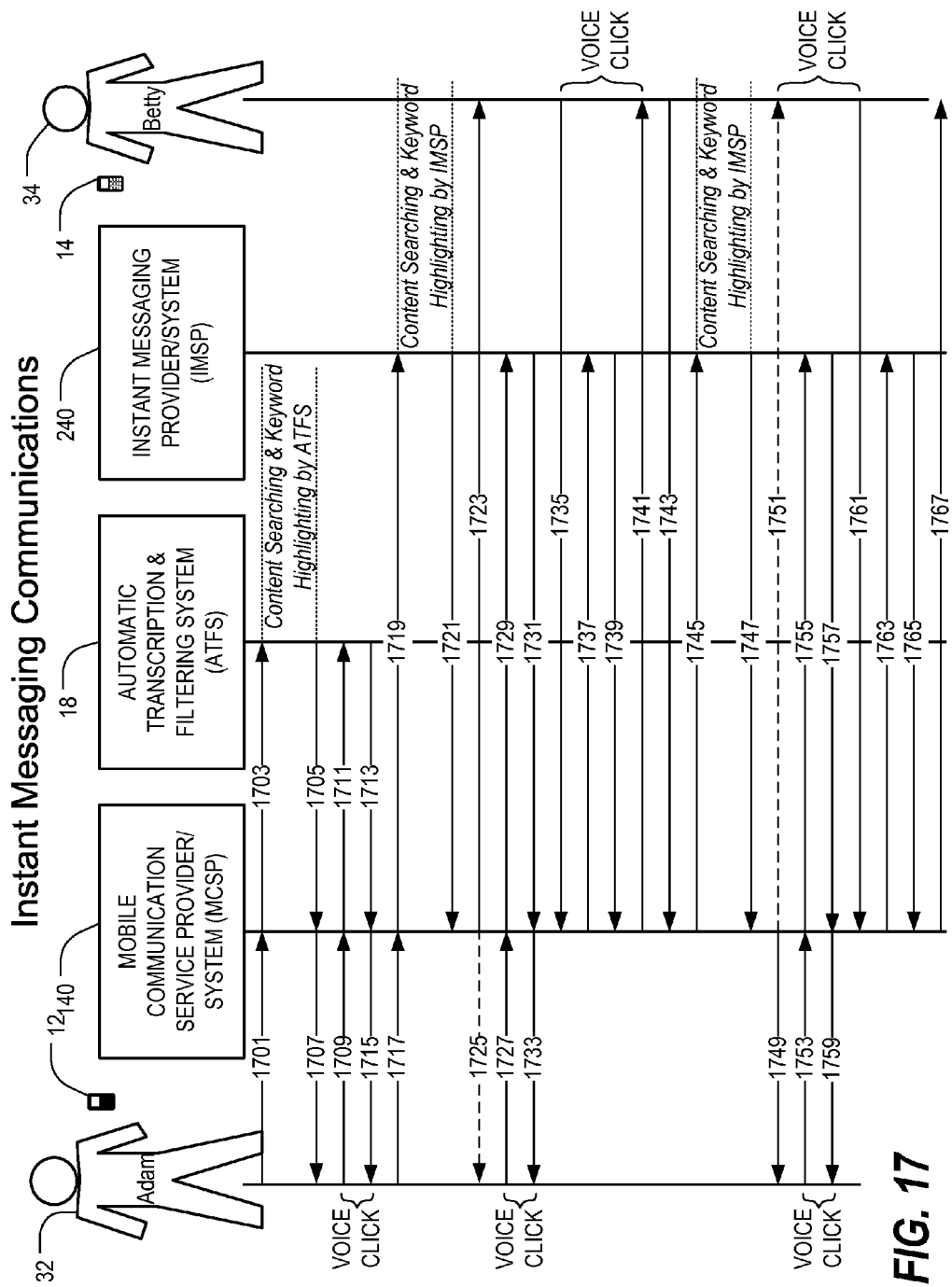
FIG. 17 is a graphical illustration showing the sequence of text messages in yet another preferred implementation of the invention, wherein content searching and keyword highlighting are performed by both the ATFS and the IM service provider in the portion of the communication system of FIG. 3.

In the sixth embodiment, voice clicking is supported separately and independently by both the ATFS 18 and the IM service provider 240. FIG. 17 is a graphical illustration showing the sequence of text messages in such an additional preferred implementation of the invention, wherein content searching and keyword highlighting are performed by both the ATFS 18 and the IM service provider 240 in the portion of the communication system 10 of FIG. 3. With reference thereto, Adam utters a message to be sent to Betty. The utterance is recorded in the form of audio data and is communicated 1701 to mobile communication service provider 140 and then communicated 1703 to the ATFS 18. In accordance with this implementation, the ATFS 18 receives and transcribes the recorded utterance from Adam and screens the transcription for words that are appropriate for highlighting.

For each word found in the screening, the ATFS 18 searches for additional content. Furthermore, the search preferably results in only "meaningful" additional content based on intelligent algorithms and relevance scoring. Those words for which additional content is found in the search are then highlighted by the ATFS 18, and the transcribed and filtered text—including the highlighted keywords—are communicated 1705 to the mobile communication service provider 140 and then communicated 1707 to Adam's mobile phone 12. Additionally, the ATFS 18 maintains an association (preferably in a database) of the highlighted words, additional content data for the respective additional content identified in the search for each of the respective screened words, and an identifier of the recipient (e.g., Adam's phone 12) to which the highlighted words were sent.

Thereafter, when a subsequent recorded utterance from Adam's phone 12 is communicated 1709,1711 and received by the ATFS 18, it is then transcribed to text and compared to the highlighted words that are maintained in association with the identifier for Adam's phone 12. Upon a match, it is determined that one of the highlighted words has been selected by Adam for display of the additional content on Adam's phone. Consequently, the additional content data maintained in association with the highlighted word of the match is sent to Adam's mobile phone 12 for display of the additional content on Adam's mobile phone 12. The additional content data (C) may comprise the additional content for display or, preferably, the additional content data comprises an Internet web address. The additional content data is communicated 1713,1715 to Adam's mobile phone 12, whereby, upon receipt, the mobile phone 12 is controlled to present content to the user. In this regard, it will be appreciated that if the content data includes a web address (e.g., www.suzysushi.com), such address may be passed to the web browser application of the mobile phone 12 for display of the web page via the web browser.

As shown in the message sequence of FIG. 17, Adam then sends 1717,1719 an instant message to Betty. The instant message from Adam to Betty includes the transcribed and filtered text received from the ATFS 18, but does not include the highlighted words from the ATFS 18. In accordance with this implementation, the IM service provider 240 receives and screens the instant message for appropriate words for searching. For each appropriate word found in the screening, the IM service provider 240 searches for additional content. Furthermore, the search preferably results in only "meaningful" additional content based on intelligent algorithms and relevance scoring. Those words for which additional content is found in the search are then highlighted by the IM service provider 140. Preferably, the instant message— including the highlighted keywords—is then communicated 1721 to the mobile communication service provider 140 and, thereafter, both is communicated 1723 to the recipient of the instant message, and communicated 1725 to the sender of the instant message for updating of the sent message on the sender's mobile phone with highlighting. Identifiers of both mobile phones 12,14 preferably are maintained in association with the highlighted keywords and respective additional content data. Alternatively, the IM service provider 240 communicates the highlighted keywords only to the recipient of the instant message, and only the mobile phone of the recipient is maintained in the association.

Thereafter, a subsequent recorded utterance from Adam's phone 12 may be communicated 1727,1729 and received and transcribed to text by the IM service provider 240, whereupon the transcription is compared to the highlighted words that are maintained in association with the identifier for Adam's phone 12. Upon a match, it is determined that one of the highlighted words has been selected for display of the additional content. Consequently, the additional content data maintained in association with the highlighted word of the match is sent to Adam's phone 12 for display of the additional content. The additional content data is communicated 1731 to the mobile communication service provider 140 and then is communicated 1733 to Adam's phone 12.

In addition, a subsequent recorded utterance from Betty's phone 14 may be communicated 1735,1737 to, and received and transcribed to text by, the IM service provider 240, whereupon the transcription is compared to the highlighted words that are maintained in association with the identifier for Betty's phone 14. Upon a match, it is determined that one of the highlighted words has been selected for display of the additional content. Consequently, the additional content data maintained in association with the highlighted word of the match is sent to Betty's phone 14 for display of the additional content. The additional content data is communicated 1739 to the mobile communication service provider 140 and then is communicated 1741 to Betty's phone 14.

In each case, the additional content data (C) may comprise the additional content for display or, preferably, the additional content data comprises an Internet web address. The additional content data is communicated to the respective mobile phone 12,14, whereby, upon receipt, the mobile phone 12,14 is controlled to present content to the user. In this regard, it will be appreciated that if the content data includes a web address (e.g., www.suzysushi.com), such address may be passed to the web browser application of the mobile phone 12 for display of the web page via the web browser.

It will be appreciated that in this implementation, the IM service provider 240 may utilize the same technology as the ATFS 18 in receiving, transcribing, and comparing an utterance to highlighted words taken from messages for which words additional content has been identified. Moreover, the ability of the IM service provider 240 to do this enables highlighting of words in instant messages from Betty to Adam even when Betty manually types the text messages on her mobile phone 14.

For example, as shown in the message sequence of FIG. 17, Betty sends an instant message to Adam. The instant message is communicated 1743,1745 to the IM service provider 240. The IM service provider 240 receives and screens the instant message from Betty for appropriate words for searching; for each appropriate word, the IM service provider 240 searches for additional content; and those words for which additional content is found in the search are then highlighted. Preferably, the instant message—including the highlighted keywords—is then communicated 1747 to the mobile communication service provider 140 and, thereafter, both is communicated 1749 to the receiver, and communicated 1751 to the sender, for updating of the sent message with highlighting. Identifiers of both mobile phones 12,14 preferably are maintained in association with the highlighted keywords and respective additional content data. Alternatively, the IM service provider 240 communicates the highlighted keywords only to the receiver.

Thereafter, a subsequent recorded utterance from Adam's phone 12 may be communicated 1753,1755 and received and transcribed to text by the IM service provider 240, whereupon the transcription is compared to the highlighted words that are maintained in association with the identifier for Adam's phone 12. Upon a match, it is determined that one of the highlighted words has been selected for display of the additional content. Consequently, the additional content data maintained in association with the highlighted word of the match is sent to Adam's phone 12 for display of the additional content. The additional content data is communicated 1757 to the mobile communication service provider 140 and then is communicated 1759 to Adam's phone 12.

In addition, a subsequent recorded utterance from Betty's phone 14 may be communicated 1761,1763 and received and transcribed to text by the IM service provider 240, whereupon the transcription is compared to the highlighted words that are maintained in association with the identifier for Betty's phone 14. Upon a match, it is determined that one of the highlighted words has been selected for display of the additional content. Consequently, the additional content data maintained in association with the highlighted word of the match is sent to Betty's phone 14 for display of the additional content. The additional content data is communicated 1765 to the mobile communication service provider 140 and then is communicated 1767 to Betty's phone 14.

It should be particularly noted that, as described above, in the fifth and sixth implementations, wherein the IM service provider 240 supports voice clicking, both Adam and Betty preferably are able to select keywords that are highlighted in a message, regardless of whether Adam or Betty is the recipient of the message. In this respect, the IM service provider 240 preferably communicates 1515,1517 and 1541, 1543 and 1723,1725 and 1749,1751 the highlighted keywords to both sender and receiver for a particular message, and identifiers of both mobile phones 12,14 preferably are maintained in association with the highlighted keywords and respective additional content data. In FIGS. 15 and 17, examples of both Adam and Betty performing voice clicks are shown. Alternatively, the IM service provider 240 communicates the highlighted keywords to the receiver.

As will be apparent from consideration of these foregoing six implementations, as text messages are propagated through a communication system 10, one or more of the elements of the system 10 may be equipped to conduct the screening, content searching, and keyword highlighting in accordance with the invention. Furthermore, the additional content could be advertising content, location data, general search information, reference information (sponsored or unsponsored) or the like, and could include video, audio, or audiovisual content.

Moreover, the screening may be configured to identify not only conventional words, but also text speech, including words like "2nite", which would be equated to "tonight" and handled in the same manner.

Furthermore, the teachings of the present invention are not confined to the English language, but are equally applicable in many other languages as well.

Optionally, in the event that there are multiple possible interpretations of an utterance in comparing the transcription thereof to maintained keywords, additional content data may be returned for every possible/known interpretation (thereby resulting, for example, in multiple tabs opening in a web browser), or only the additional content data corresponding to the highest confidence in the match may be returned.

Still yet, it is contemplated that highlighted keywords will be displayed, but it will not be possible to speak them in order to expand the additional content for viewing. This may be because the user has entered a noisy environment, or has entered a very quiet environment where it would be disruptive to speak. In this case, a manual method of selecting highlighted keywords is made available to augment voice-clicking. This may be keyboard navigation, navigation via a touch panel, navigation via a pointing device, or any other conventional navigation means.

It also will be appreciated that the association maintained between the keywords, the respective additional content data, and the identifiers may be kept for a short period of time (minutes or hours), or a longer period of time (days, weeks, or months). Accordingly, a user may retrieve the additional content in certain situations if that user remembers the keyword.

Furthermore, voice commands or cues may be used to indicate that an utterance is intended to be a keyword and that the additional content data is desired to be sent. In this regard, the cue may be "Go" and used, for example, by sending recorded audio representing the utterance "Go Sushi". Additionally, it is contemplated that selection of an appropriate button on the user's mobile device will indicate the desired recipient of an utterance, and utterances in certain scenarios may be appropriate for sending to more than one recipient (such as in the third implementation, wherein both the ATFS 18 and mobile communication service provider 140 transcribe utterances, or in the sixth implementation, wherein both the ATFS 18 and IM service provider 240 transcribe utterances).

It will also be appreciated that in some embodiments of the invention, the transcription of one or more utterances can be performed by a mobile communication device rather than by, for example, a backend server. For instance, in some embodiments an utterance in performance of a voice click may be transcribed by the mobile communication device rather than by a server.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

For example, in one alternative embodiment of the invention in which a transcript is played on the mobile communication device for verification before sending, instead of aural cueing, tactile cueing is used. For example, when a word is played back for which additional content is available, the mobile phone may vibrate in order to emphasize such word. Such tactile cueing may be used in place of, or in addition to, aural cueing.

Additionally, rather than present additional content upon utterance of an emphasized word in accordance with the foregoing embodiments and implementations of the invention, some other action may occur in addition to, or in substitution for, the presentation of such additional content, such as, for example, the opening of an application on the mobile communication device and the calling of a telephone number.

What is claimed is:

1. A computer-implemented method of presenting additional content for a term presented by a first mobile communication device, the computer-implemented method comprising:
   receiving, by the first mobile communication device, a first utterance;
   transmitting, by the first mobile communication device, a first identifier of the first mobile communication device and the first utterance to a server;
   receiving, by the first mobile communication device from the server, text representing a transcription of the first utterance;
   receiving, by the first mobile communication device from the server, an indicator that first additional content is available for a term identified within the text by the indicator, wherein the term is associated at the server with the first identifier of the first mobile communication device and a second identifier of a second mobile communication device, and wherein the first additional content for the term is associated with the first identifier and the second identifier;
   presenting, on the first mobile communication device, the text with an emphasis on the term identified by the indicator;
   after presenting the text on the first mobile communication device, receiving, by the first mobile communication device, a second utterance that includes the term;
   transmitting, by the first mobile communication device, the first identifier and the second utterance to the server;
   receiving, by the first mobile communication device from the server, in response to transmitting the second utterance and the first identifier, the first additional content;
   presenting, on the first mobile communication device the first additional content for the term;
   transmitting, by the first mobile communication device, the second identifier to the server, the server configured to send the text as well as the indicator that first additional content is available for the term to the second mobile communication device using the second identifier of the second mobile communication device; and
   receiving, by the first mobile communication device from the server, a message including a transcribed third utterance received by the second communication device in response to the text.

2. The method of claim 1, wherein the first mobile communication device is a phone.

3. The method of claim 1, wherein the first additional content is presented by playing audio over a speaker of the first mobile communication device.

4. The method of claim 1, wherein presenting the text on the first mobile communication device, including emphasizing the term comprises playing audio of the text on the first mobile communication device, wherein the audio includes pronunciation emphasis for the term.

5. The method of claim 1, wherein presenting the text on the first mobile communication device with an emphasis on the term identified by the indicator comprises playing audio of the text on the first mobile communication device, wherein the audio includes aural cueing for the term.

6. The method of claim 1, wherein presenting the text on the first mobile communication device with an emphasis on the term identified by the indicator comprises displaying the text on the first mobile communication device such that the term is highlighted.

7. The method of claim 6, wherein the first additional content for the term is presented by expanding the displayed text to include the respective additional content in conjunction with the term.

8. The method of claim 1, wherein the first additional content comprises at least one of a web address, an email address, or geospatial information.

9. The method of claim 1, wherein the first additional content is presented by displaying a video on the first mobile communication device.

10. The method of claim 1, wherein the first additional content is presented in a web browser of the first mobile communication device.

11. The method of claim 1, wherein the first additional content is presented in a popup window of the first mobile communication device.

12. The method of claim 1, wherein the term consists of a single word.

13. The method of claim 1, wherein the term comprises a phrase.

14. The method of claim 1, wherein the term comprises an alphanumeric string.

15. The method of claim 1, wherein the second utterance is transmitted with a cue indicating that the second utterance includes the term.

16. The method of claim 1, wherein multiple alternative first additional content exists for the term and are available for presentation by the first mobile communication device, and wherein the method further comprises presenting, on the first mobile communication device, the first additional content of each alternative first additional content of the multiple alternative first additional content.

17. The method of claim 1, further comprising receiving non-verbal input by the first mobile communication device, which input represents a selection of term that is emphasized; and presenting, on the first mobile communication device, the first additional content for the term of the selection, whereby the first additional content may be presented during times when the first mobile communication device is unable to successfully receive an utterance.

18. The method of claim 1, wherein multiple alternative first additional content exists for the term and are available for presentation by the first mobile communication device, and wherein the method further comprises selecting and presenting at least one alternative first additional content of the multiple alternative first additional content.

19. The method of claim 18, wherein selecting the at least one alternative first additional content of the multiple alternative first additional content is performed by a user of the first mobile communication device.

20. The method of claim 18, wherein selecting the at least one alternative first additional content of the multiple alternative first additional content is performed in accordance with a computer algorithm.

21. The method of claim 1, wherein receiving the text representing a transcription of the first utterance includes receiving a plurality of terms associated with the first identifier of the first mobile communication device.

22. A non-transitory computer-readable medium whose contents configure one or more computing systems to perform a method of presenting additional content for a term presented by a first mobile communication device, the method comprising:
receiving, by the first mobile communication device, a first utterance;
transmitting a first identifier of the first mobile communication device and the first utterance from the first mobile communication device to a computing device;
receiving, by the first mobile communication device from the computing device, text representing a transcription of the first utterance;
receiving, by the first mobile communication device from the computing device, an indicator that first additional content is available for a term identified within the text by the indicator, wherein the term is associated at the computing device with the first identifier of the first mobile communication device and a second identifier of a second mobile communication device, and wherein the first additional content for the term is associated with the first identifier and the second identifier;
presenting, on the first mobile communications device, the text with an emphasis on the term identified by the indicator;
after presenting the text on the first mobile communication device, receiving, by the first mobile communication device, a second utterance that includes the term;
transmitting, by the first mobile communication device, the first identifier and the second utterance to the computing device;
receiving, by the first mobile communication device from the computing device, in response to transmitting the second utterance and the first identifier, the first additional content;
presenting, on the first mobile communication device, the first additional content for the term;
transmitting, by the first mobile communication device, the second identifier to the computing device, the computing device configured to send the text as well as the indicator that first additional content is available for the term to the second mobile communication device using the second identifier; and
receiving, by the first mobile communication device from the computing device, a message including a transcribed third utterance received by the second communication device in response to the text.

23. The non-transitory computer-readable medium of claim 22, wherein the first mobile communication device is at least one of a phone, a PDS, a tablet notebook or a two-way pager.

24. The non-transitory computer-readable medium of claim 22, wherein presenting the text on the first mobile communication device with an emphasis on the term identified by the indicator comprises playing audio of the text on the first mobile communication device, wherein the audio includes one or more of pronunciation emphasis for the term or aural cueing for the term.

25. The non-transitory computer-readable medium of claim 22, wherein presenting the text on the first mobile communication device with an emphasis on the term identified by the indicator comprises displaying the text on the first mobile communication device such that the term is highlighted.

26. The non-transitory computer-readable medium of claim 22, wherein presenting the first additional content for the term on the first mobile communication device comprises one or more of playing audio over a speaker of the first mobile communication device, expanding the displayed text to include the respective first additional content in conjunction with the term, or displaying a video on the first mobile communication device.

27. The non-transitory computer-readable medium of claim 22, wherein the first additional content comprises one or more of a web address, an email address, or geospatial information.

28. The non-transitory computer-readable medium of claim 22, wherein the first additional content is presented in one or more of a web browser of the first mobile communication device or a popup window of the first mobile communication device.

29. The non-transitory computer-readable medium of claim 22, wherein the term comprises one of more of a single word, a phrase, or an alphanumeric string.

30. The non-transitory computer-readable medium of claim 22, wherein the second utterance is transmitted with a cue indicating that the second utterance includes an emphasized term.

31. The non-transitory computer-readable medium of claim 22, wherein multiple alternative first additional content exists for the term and are available for presentation by the first mobile communication device, and wherein the method further comprises presenting by the first mobile communication device the first additional content of each such alternative.

32. The non-transitory computer-readable medium of claim 22, wherein the method further comprises receiving non-verbal input by the first mobile communication device, which input represents a selection of an emphasized term; and presenting, by the first mobile communication device, the first additional content for the selected term, whereby the first additional content may be presented during times when the first mobile communication device is unable to successfully receive an utterance.

33. The non-transitory computer-readable medium of claim 22, wherein multiple alternative first additional content exists for the term and are available for presentation by the first mobile communication device, and wherein the method further comprises presenting, on the first mobile communication device, the multiple alternative first additional content.

34. The non-transitory computer-readable medium of claim 33, wherein selecting the first additional content of one of the alternatives is performed by a user of the first mobile communication device or in accordance with a computer algorithm.

35. The non-transitory computer-readable medium of claim 22, wherein receiving the text from the first computing device includes receiving a plurality of terms that have been selected by the first computing device from the transcription and associated with the identifier of the first mobile communication device.

36. A system for presenting additional content for a term presented by a first mobile communication device, the system comprising one or more processors executing instructions configured to:
  receive, by the first mobile communication device, a first utterance;
  transmit, by the first mobile communication device, a first identifier of the first mobile communication device and the first utterance to a computing device;
  receive, by the first mobile communication device from the computing device, text representing a transcription of the first utterance;
  receive, by the first mobile communication device from the computing device, an indicator that first additional content is available for a term identified within the text by the indicator, wherein the term is associated at the computing device with the first identifier of the first mobile communication device and a second identifier of a second mobile communication device, and wherein the first additional content for the term is associated with the first identifier and the second identifier;
  present, on the first mobile communication device, the text with an emphasis on the term identified by the indicator;
  after presenting the text on the first mobile communication device, receive, by the first mobile communication device, a second utterance that includes the term;
  transmit, by the first mobile communication device, the first identifier and the second utterance to the computing device;
  receive, by the first mobile communication device from the computing device, in response to transmitting the second utterance and the first identifier, the first additional content;
  present, on the first mobile communication device, the first additional content for the term;
  transmit, by the first mobile communication device, the second identifier to the computing device, the computing device configured to send the text as well as the indicator that first additional content is available for the term to the second mobile communication device using the second identifier; and
  receive, by the first mobile communication device from the computing device, a message including a transcribed third utterance received by the second communication device in response to the text.

37. The system of claim 36, wherein the one or more processors executing the instructions are configured to present the text on the first mobile communication device by playing audio of the text on the first mobile communication device, wherein the audio includes one or more of pronunciation emphasis for the term or aural cueing for the term.

38. The system of claim 36, wherein the one or more processors executing the instructions are configured to present the text representing the transcription on the first mobile communication device by displaying the text representing the transcription on the first mobile communication device such that within the text representing the transcription the term is highlighted.

39. The system of claim 36, wherein the one or more processors executing the instructions are configured to present the first additional content for the term on the first mobile communication device by at least one of playing audio over a speaker of the first mobile communication device, expanding the presented text representing the transcription to include the respective first additional content in conjunction with the term, or displaying a video on the first mobile communication device.

40. The system of claim 36, wherein the first additional content comprises one or more of a web address, an email address, or geospatial information.

41. The system of claim 36, wherein multiple alternative first additional content exists for the term and are available for presentation by the first mobile communication device, and wherein the one or more processors executing the instructions are further configured to present, on the first mobile communication device, the multiple alternative first.

42. The system of claim 36, wherein the one or more processors executing the instructions are further configured to receive non-verbal input by the first mobile communication device, which input represents a selection of the term that is emphasized; and present, on the first mobile communication device, the first additional content for the term, whereby the first additional content may be presented during times when the first mobile communication device is unable to successfully receive an utterance.

43. The system of claim 36, wherein multiple alternative first additional content exists for the term and are available for presentation by the first mobile communication device, and wherein the one or more processors executing the instructions are configured to present at least one alternative first additional content of the multiple alternative first additional content.

44. The system of claim 43, wherein the one or more processors executing the instructions are configured to select the at least one alternative first additional content of the multiple alternative first additional content by input from a user of the first mobile communication device or in accordance with a computer algorithm.

45. The system of claim 36, wherein to receive the text representing a transcription of the first utterance, the one or more processors executing the instructions are configured to receive a plurality of terms associated with the identifier of the first mobile communication device.

* * * * *

UNITED STATES PATENT AND TRADEMARK OFFICE
CERTIFICATE OF CORRECTION

PATENT NO.          : 9,436,951 B1
APPLICATION NO.     : 12/198116
DATED               : September 6, 2016
INVENTOR(S)         : Victor Roman Jablokov It is certified that error appears in the above-identified patent and that said Letters Patent is hereby corrected as shown below:

Title Page

In column 2 (page 3, item 56) at line 22, Under Other Publications, change "Patnet" to --Patent--.

In column 2 (page 3, item 56) at line 36, Under Other Publications, change "Broadcase" to --Broadcast--.

In column 2 (page 3, item 56) at line 37, Under Other Publications, change "fo" to --of--.

In column 2 (page 3, item 56) at lines 38-39, Under Other Publications, change "annontation" to --annotation--.

In column 2 (page 3, item 56) at line 40, Under Other Publications, change "Disclousre" to --Disclosure--.

In column 2 (page 3, item 56) at line 42, Under Other Publications, change "Disclousre" to --Disclosure--.

In column 2 (page 3, item 56) at line 44, Under Other Publications, change "Disclousre" to --Disclosure--.

In column 2 (page 3, item 56) at line 46, Under Other Publications, change "Disclousre" to --Disclosure--.

In column 2 (page 3, item 56) at line 50, Under Other Publications, change "Assocation" to --Association--.

Signed and Sealed this
Twentieth Day of December, 2016

Michelle K. Lee
*Director of the United States Patent and Trademark Office*

CERTIFICATE OF CORRECTION (continued)
U.S. Pat. No. 9,436,951 B1

In the Specification

In column 2 at line 49, After "2008" insert --.--.

In column 20 at line 38, Change "that that" to --that--.

In the Claims

In column 38 at line 32 (approx.), In Claim 41, change "first." to --first additional content.--.